(12) United States Patent
Hirota et al.

(10) Patent No.: US 8,191,696 B2
(45) Date of Patent: Jun. 5, 2012

(54) TORQUE TRANSMISSION APPARATUS

(75) Inventors: Isao Hirota, Tochigi (JP); Norihiko Tashiro, Tochigi (JP); Satoshi Murakami, Tochigi (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 951 days.

(21) Appl. No.: 12/281,148

(22) PCT Filed: Feb. 28, 2007

(86) PCT No.: PCT/JP2007/053807
§ 371 (c)(1),
(2), (4) Date: Aug. 28, 2008

(87) PCT Pub. No.: WO2007/100011
PCT Pub. Date: Sep. 7, 2007

(65) Prior Publication Data
US 2009/0008207 A1    Jan. 8, 2009

(30) Foreign Application Priority Data

Feb. 28, 2006  (JP) ................................ 2006-053268

(51) Int. Cl.
*F16D 27/115* (2006.01)
*F16D 13/72* (2006.01)
*F16D 13/74* (2006.01)

(52) U.S. Cl. .................. 192/35; 192/70.12; 192/113.34; 192/84.7

(58) Field of Classification Search ................ 192/70.12, 192/113.3, 113.34, 84.7, 35
See application file for complete search history.

(56) References Cited

U.S. PATENT DOCUMENTS

| 2,049,234 | A | | 7/1936 | Thomas et al. |
| 3,366,210 | A | | 1/1968 | Webster |
| 4,540,077 | A | | 9/1985 | Yamamoto et al. |
| 4,693,350 | A | | 9/1987 | Sommer |
| 5,495,927 | A | * | 3/1996 | Samie et al. ............... 192/70.12 |
| 5,720,372 | A | * | 2/1998 | Shino et al. ............... 192/70.12 |
| 6,779,642 | B2 | * | 8/2004 | Arai et al. .................. 192/70.12 |
| 6,997,294 | B2 | * | 2/2006 | Ochiai et al. .................... 192/35 |
| 7,210,565 | B2 | * | 5/2007 | Yamazaki ....................... 192/35 |
| 2001/0023796 | A1 | | 9/2001 | Taki et al. |
| 2003/0173180 | A1 | * | 9/2003 | Nakaba et al. .................. 192/35 |
| 2004/0069586 | A1 | * | 4/2004 | Sasse .......................... 192/70.12 |
| 2005/0003923 | A1 | * | 1/2005 | Ishikawa ....................... 475/223 |
| 2005/0107200 | A1 | * | 5/2005 | Yamazaki et al. ............... 475/84 |
| 2005/0167225 | A1 | * | 8/2005 | Sakai et al. ..................... 192/35 |

FOREIGN PATENT DOCUMENTS

| DE | 718 161 | | 3/1942 |
| JP | 58-181054 U | | 12/1983 |
| JP | 63-20564 U | | 2/1988 |
| JP | 3-124 U | | 1/1991 |
| JP | 2000-257706 A | | 9/2000 |
| JP | 2001-020975 A | | 1/2001 |

(Continued)

*Primary Examiner* — David D Le
*Assistant Examiner* — Jude Agendia
(74) *Attorney, Agent, or Firm* — Morrison & Foerster LLP

(57) ABSTRACT

A torque transmission apparatus includes first and second torque transmission members 3, 5, a frictional clutch 7 for transmitting a torque between the torque transmission members 3, 5, a stationary housing 11 accommodating a coupling 9, a spatial part for enclosing oil in the stationary housing 11 and an opening 15 formed in a part of the coupling 9 so that the oil in the stationary housing 11 is introduced into the coupling 9.

18 Claims, 25 Drawing Sheets

FOREIGN PATENT DOCUMENTS

| | | |
|---|---|---|
| JP | 2002-357233 A | 12/2002 |
| JP | 2002-364739 A | 12/2002 |
| JP | 2003-004068 A | 1/2003 |
| JP | 2005-207578 A | 8/2005 |
| WO | WO-2005/115790 A1 | 12/2005 |
| WO | WO-2006/015394 A1 | 2/2006 |

* cited by examiner

FIG. 18
| | OPENING SPEC. | ENCLOSED OIL VOLUME (mL) | ROTATING SPEED (rpm) | INTRODUCTION OIL VOLUME INTO COUPLING (%) | | SUM (%) |
|---|---|---|---|---|---|---|
| | | | | MAIN CLUTCH | PILOT CLUTCH | |
| 1 | A | L | 240 | 10.4 | 3.1 | 13.4 |
| 2 | B | L | 240 | 10.5 | 8.1 | 18.6 |
| 3 | C | L | 240 | 8.2 | 4.9 | 13.1 |
| 4 | D | L | 240 | 2.1 | 0 | 2.1 |
FIG. 19
| | PROTRUSION | ENCLOSED OIL VOLUME (mL) | ROTATING SPEED (rpm) | INTRODUCTION OIL VOLUME INTO COUPLING (%) | | SUM (%) |
|---|---|---|---|---|---|---|
| | | | | MAIN CLUTCH | PILOT CLUTCH | |
| 1 | NONE | L | 240 | 1.4 | 0 | 1.4 |
| 2 |  | L | 240 | 2.1 | 1.4 | 3.5 |
| 3 |  | L | 240 | 10.4 | 3.1 | 13.5 |
| 4 |  | 2L | 240 | 13.5 | 3.9 | 17.4 |

US 8,191,696 B2

TORQUE TRANSMISSION APPARATUS

This application is a United States National Stage Application under 35 U.S.C §371 of International Patent Application No. PCT/JP2007/053807, filed Feb. 28, 2007, which claims the benefit to Japanese Patent Application No. 2006-053628, filed Feb. 28, 2006, each of which is incorporated by refrence into this application as if fully set forth herein.

TECHNICAL FIELD

The present invention relates to, in a vehicle, a torque transmission apparatus for transmitting a motor torque to vehicle's wheels.

BACKGROUND OF ART

Japanese Patent Laid-Open Publication No. 2001-20975 discloses, in a four-wheel-drive vehicle, a torque transmission apparatus which transmits a motor torque from the side of main driving wheels (i.e. front wheels) to the side of sub-driving wheels (i.e. rear wheels) through a coupling.

In this coupling, oil is closely sealed in a rotating casing to lubricate sliding frictional parts, such as clutches and bearings, accommodated in the casing. With this arrangement, the coupling is ensured in its performance.

DISCLOSURE OF THE INVENTION

In the above technique where oil is simply enclosed in the rotating casing, however, there is a limit in the amount of usable oil. In such a case, when the torque intermittence is frequently performed by the clutch, an oil temperature rises. As a result, the frictional characteristics of the sliding frictional parts change thereby to cause the torque transmission property to be deteriorated.

Additionally, if the lubricity of oil deteriorates with repeated rises in the temperature, another problem arises in that the durability of members or mechanisms requiring to be lubricated also deteriorates.

Under the above situation, an object of the present invention is to provide a torque transmission apparatus that suppresses a reduction in transmission torque caused by the rise in oil temperature whereby the durability of a coupling can be improved.

According to a main aspect of the present invention, there is provided a torque transmission apparatus comprising: a coupling having first and second torque transmission members and a frictional clutch for transmitting a torque between the first torque transmission member and the second torque transmission member; and a stationary housing accommodating the coupling, wherein the coupling includes an opening for introducing oil enclosed in the stationary housing into the coupling.

BRIEF DESCRIPTION OF THE DRAWINGS

FIG. 18 is a diagram showing the effect of introducing oil in patterns A, B, C and D.
FIG. 19 is a diagram showing different oil introducing effects depending on the presence of a protrusion, its position and so on.

BEST MODE FOR CARRYING OUT THE INVENTION

Figure 24:
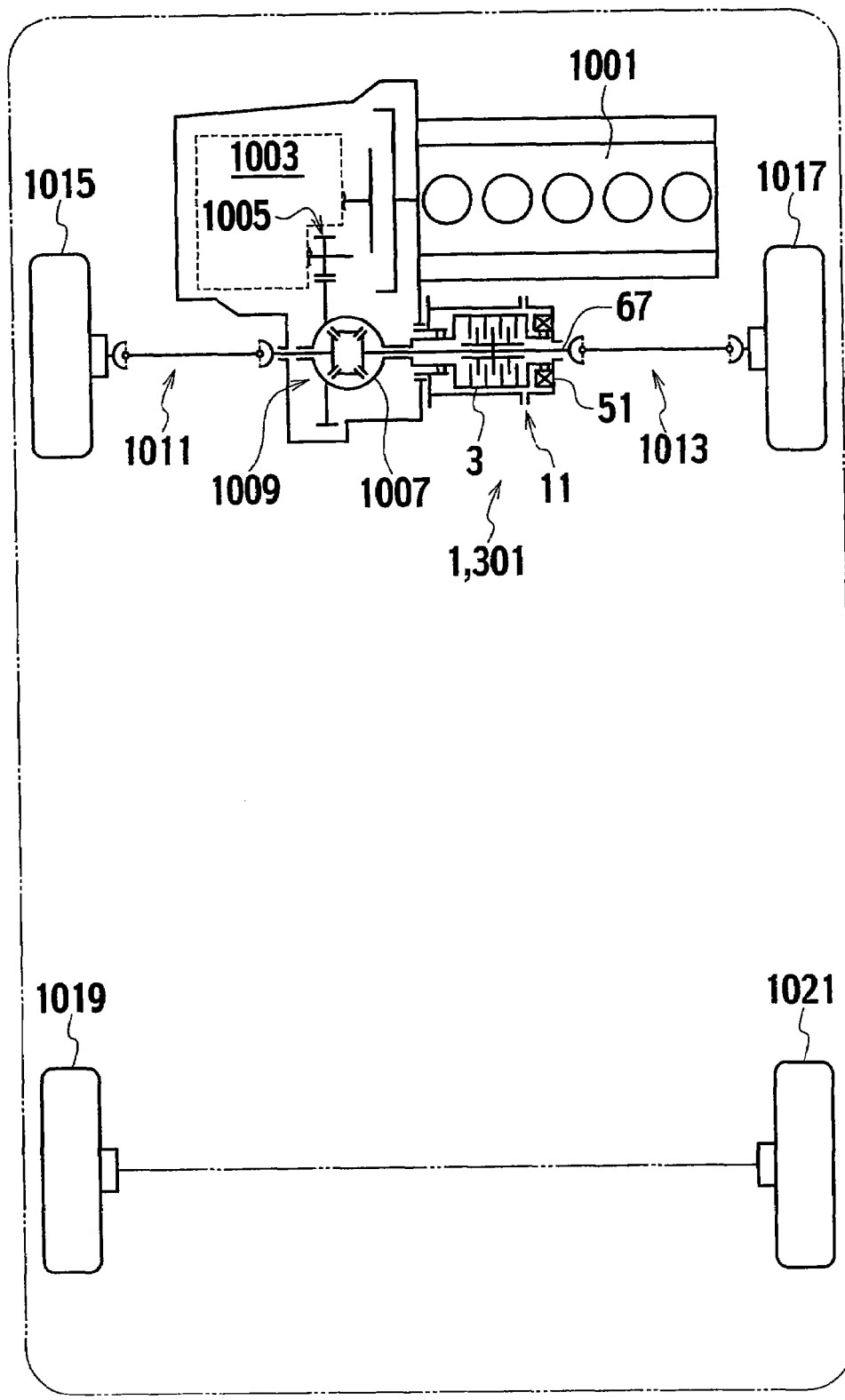
FIG. 24 is a skeleton structural view showing a power system of a vehicle equipped with the torque transmission apparatus 1 and the torque transmission apparatus 301.

Referring to FIGS. 1 to 19 and FIG. 24, a torque transmission apparatuses 1 will be described. FIG. 24 is a skeleton structural view showing a power system of a vehicle equipped with the torque transmission apparatus 1. In this figure, a left-and-right direction coincides with a left-and-right direction of this vehicle.

[Constitution of Torque Transmission Apparatus 1]

The torque transmission apparatuses 1 includes a coupling 9 having a rotating casing 3 (first torque transmission member), a hub 5 (second torque transmission member) and a main clutch 7 (frictional clutch) for transmitting a torque between the rotating casing 3 and the hub 5, a stationary hosing 11 accommodating the coupling 9, oil 13 enclosed in the stationary housing 11 and openings 15 formed in a part of the coupling 9 (in pattern A) so that the oil 13 in the stationary housing 11 is introduced into the coupling 9.

Again, the stationary housing 11 includes a first radial sidewall 17, a second radial sidewall 19 and a first circumferential wall 21 connecting the first and second sidewalls 17, 19 with each other, while the rotating casing 3 includes a third radial sidewall 23, a fourth radial sidewall 25 and a second circumferential sidewall 27 connecting the third and fourth sidewalls 23, 25 with each other. The oil 13 is enclosed in a spatial part 29 surrounded by: the first radial sidewall 17 and the third radial sidewall 23; the second radial sidewall 19 and the fourth sidewall 25; and the first circumferential wall 21 and the second circumferential wall 27, by a predetermined volume (e.g. about 20-30% of the whole volume of the spatial part 29).

The spatial part 29 comprises a first spatial part SP1 defined by the first radial sidewall 17 and the third radial sidewall 23, a second spatial part SP2 defined by the second radial sidewall 19 and the fourth sidewall 25 and a third spatial part SP3 defined by the first circumferential wall 21 and the second circumferential wall 27.

The third spatial part SP3, which has a coaxial and double-annular structure along the axial direction of the rotating casing 3, is adapted so that the first circumferential wall 21 and the second circumferential wall 27 form a predetermined narrow opposing gap G1. With the establishment of this opposing gap G1 as a narrow gap, when the rotating casing 3 rotates, the oil 13 moves along an inner circumferential surface of the first circumferential wall 21 upward in the vertical direction in opposition to oil's own weight, effecting the rotational flowage of the oil as a whole. Then, the oil moves upward in the vertical direction along the inner circumferential surface of the first circumferential wall 21 while remaining a fluid power due to the rotation.

Again, the first circumferential wall 21 is provided, on an upper part thereof in the vertical direction, with a protrusion 31 that projects against the inside in the radial direction. Side faces 32, 32 of the protrusion 31 convert a direction of the fluid power due to the rotation from the rotating direction to the radial direction thereby to introduce the oil 13 into the openings 15.

Furthermore, the openings 15 are formed in the second circumferential wall 27 in positions opposing the protrusion 21 during the rotation. An outer plate 33 and inner plates 35 (a plurality of fastening members) are arranged on the inner circumferential side of the second circumferential wall 27. The openings 15 are formed so as to allow the plates 33, 35 to be exposed along the rotating axis of the second circumferential wall 27. The protrusion 31 is elongated so as to be able to oppose the plates 33, 35.

The protrusion 31 has an end face 37, while the openings 15 are formed so that their widths W1, W2, W3 and W4 in the rotating direction are each broader than a width W2 of the end face 37 in the rotating direction (FIGS. 3, 7, 11, 15). The first circumferential wall 21 is formed so as to gradually increase its diameter from a left-end side (one side) of the rotating casing 3 in the rotating direction to the right-end side (the other side). The second circumferential wall 27 has a large diametrical part 39 narrowing a gap G2 between both opposing portions of the first circumferential wall 21 and the second circumferential wall 27.

The stationary housing 11 includes a first housing part 41 and a second housing part 43. On the inner circumferential side of the second circumferential wall 27, there are arranged: the main clutch 7 (first frictional clutch) and a pilot clutch 45 (second frictional clutch) as the frictional clutch; and a ball cam 47 (cam mechanism) that converts a fastening force of the pilot clutch 45 to a cam thrust force (axial thrust) and also fastens the pilot clutch 45 by the cam thrust force. The openings 15 are formed in the second circumferential wall 27 so as to allow all of the main clutch 7, the pilot clutch 45 and the ball cam 47 to be exposed to outside through the openings 15.

[Constitution of Power System]

In the above-mentioned power system, as shown in FIG. 24, a driving force of an engine 1001 is transmitted: from a transmission 1003 to a reduction gear mechanism 1005; then from the reduction gear mechanism 1005 to a differential casing 1007; and then from the differential casing 1007 to a front differential 1009 and further distributed to left and right front wheels 1015, 1017 through axles 1011, 1013. While, left and right rear wheels 1019, 1021 rotate with the traveling of the vehicle.

Since the rotating casing 3 is connected to the differential casing 1007 while the hub 5 is connected to a power transmitting shaft 67 (second torque transmission member) forming a part of the right axle 1013, the torque transmission apparatus 1 functions as a limited-slip differential of the front differential 1009, as stated below.

[Constitution of Torque Transmission Apparatus 1]

In the stationary housing 11, the housing parts 41, 43 are fixed to each other by bolts 49. The coupling 9 accommodated in the stationary housing 11 comprises, in addition to: the rotating casing 3; the hub 5; the main clutch 7; the pilot clutch 45; and the ball cam 47, an electromagnet coil 51 (actuator), an armature 53, a controller and so on.

In the rotating casing 3, its left end is supported by the stationary housing 11 through a both side-seal type ball bearing 55, while the right end is supported by the stationary housing 11 through a both side-seal type ball bearing 57 and a core 59 of the electromagnet coil 51. On the inner circumference of the left end of the rotating casing 3, a spline part 61 is formed to effect a spline connection with the differential casing 1007 of the front differential 1009.

The hub 5 has left and right ends supported by the rotating casing 3 through a ball bearing 63 and a needle bearing 65, respectively. Again, the hub 5 comprises a hollow member through which the power transmitting shaft 67 forming a part of the right axle 1013 penetrates from side to side. In the main clutch 7, the outer plate 33 is spline-connected to the inner circumference of the rotating casing 3, while the inner plates 35 are spline-connected to the outer circumference of the hub 5. Each of the inner plates 35 is provided with oil holes 101 that promote the movement of the oil 13, especially, enhance lubrication effect between the plates 33 and 35.

The ball cam 47 is interposed between a cam ring 69 and a pressure plate 71. The cam ring 69 is supported on the outer circumference of the hub 5 so as to be rotatable relatively to it. The pressure plate 71 is spline-connected to the outer circumference of the hub 5 so as to be axially movable to it. A bearing 73 is arranged between the cam ring 69 and the sidewall 25 to receive a cam reaction force of the ball cam 47. The armature 53 is arranged between the pilot clutch 45 and the pressure plate 71 and also spline-connected to the inner circumference of the rotating casing 3 so as to be axially movable to it. The sidewall 25 is screw-engaged with the left end of the circumferential wall 27 and axially positioned by a nut 75 functioning as a double-nut locking member. In the electromagnet coil 51, the core 59 is whirl-stopped to the stationary housing 11 by a pin 77.

A seal 79 is interposed between the left end of the stationary housing 11 and the rotating casing 3 to compart an oil lubrication space on the side of the transmission 1003 from an oil lubrication space on the side of the torque transmission apparatus 1, while a seal 81 is interposed between the right end of the stationary housing 11 and the power transmitting shaft 67 to compart the oil lubrication space on the side of the torque transmission apparatus 1 from an atmospheric space, both preventing a leakage of the oil 13 and an invasion of foreign matter. Further, there are arranged X-rings 83, 84 as seals having X-shaped cross sections between the hub 5 and the rotating casing 3, an O-ring 85 between the circumferential wall 27 of the rotating casing 3 and the sidewall 25 and an O-ring 87 between the hub 5 and the power transmitting shaft 67, defining the above-mentioned two oil lubrication spaces.

The controller (not shown) carries out the operations of exciting the electromagnet coil 51, controlling an exciting current, stopping the excitation and so on. When the electromagnet coil 51 is excited by the controller, the armature 53 is attracted to fasten the pilot clutch 45. Consequently, the ball cam 47 on receipt of torque operates to produce a cam thrust force. Due to the cam thrust force, the pressure plate 71 presses the main clutch 7 for its fastening. By this fastening force, the differential rotation in the front differential 1009 (i.e. rotation between the front wheels 1015, 1017) is limited. Then, if the controller controls the exciting current, the cam thrust force of the ball cam 47 is changed due to a slipping of the pilot clutch 45, allowing the limited-slip differential force of the main clutch 7 to be adjusted. For instance, if enhancing the fastening force of the pilot clutch 45, then the main clutch 7 is strongly fastened by the ball cam 47, allowing the differential motion of the front differential 1009 to be locked up.

Meanwhile, if the excitation of the electromagnet coil 51 is stopped, then the main clutch 7 is released, so that the differential motion of the front differential 1007 gets unrestrained.

Additionally, as the main clutch 7 (frictional clutch) is disposed between the differential casing 1007 and the right axle 1013 as one axle of the vehicle, the exciting current to the exciting coil 51 as the actuator has only to be controlled so as to vary according to the turning direction of the vehicle in order to accomplish equal differential-motion restraint against the left and right wheels.

[Openings 15 in Pattern A]

Figure 1:
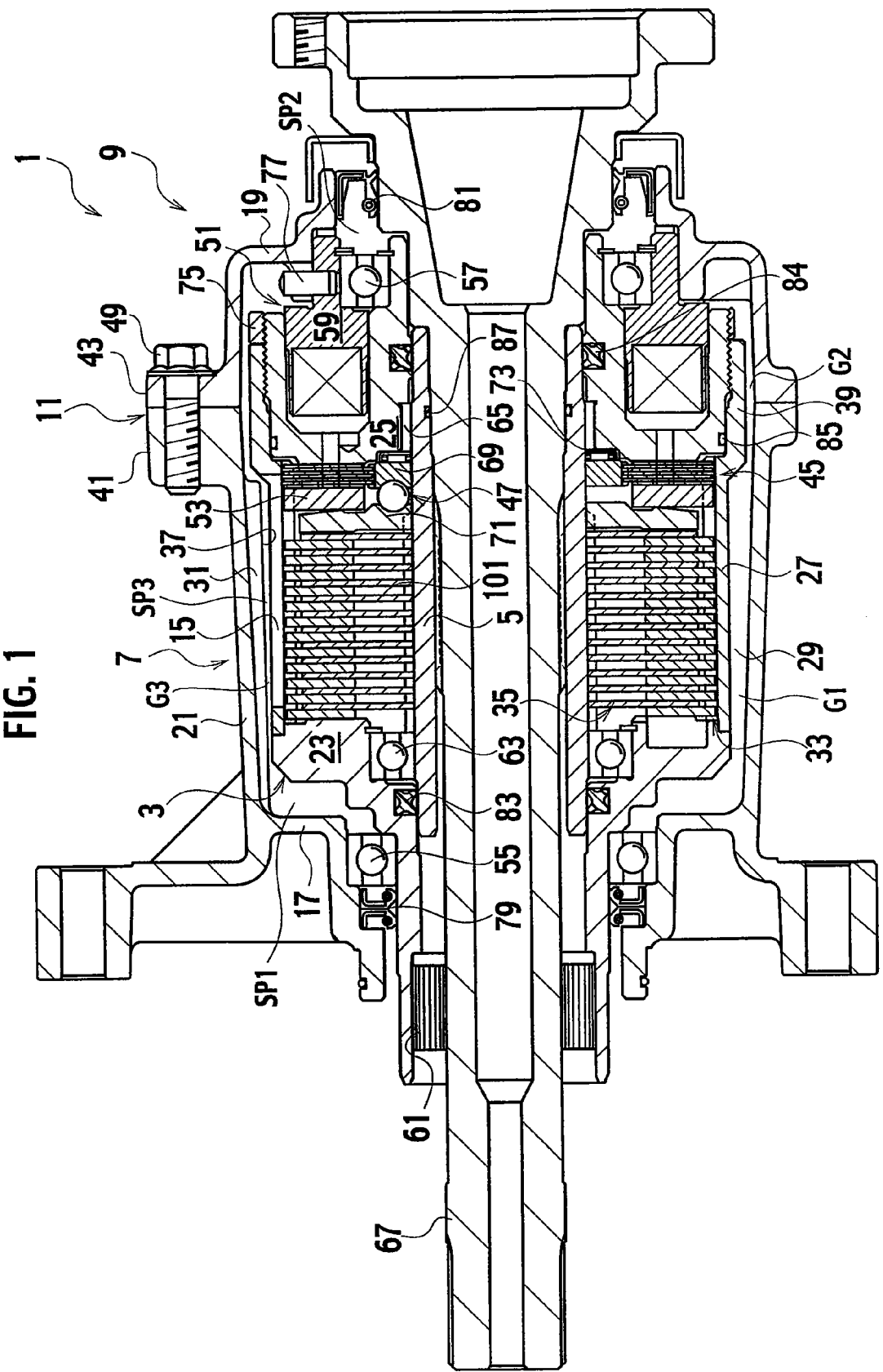
FIG. 1 is a sectional view of a torque transmission apparatus 1 in accordance with a first embodiment of the invention.
Figure 2:
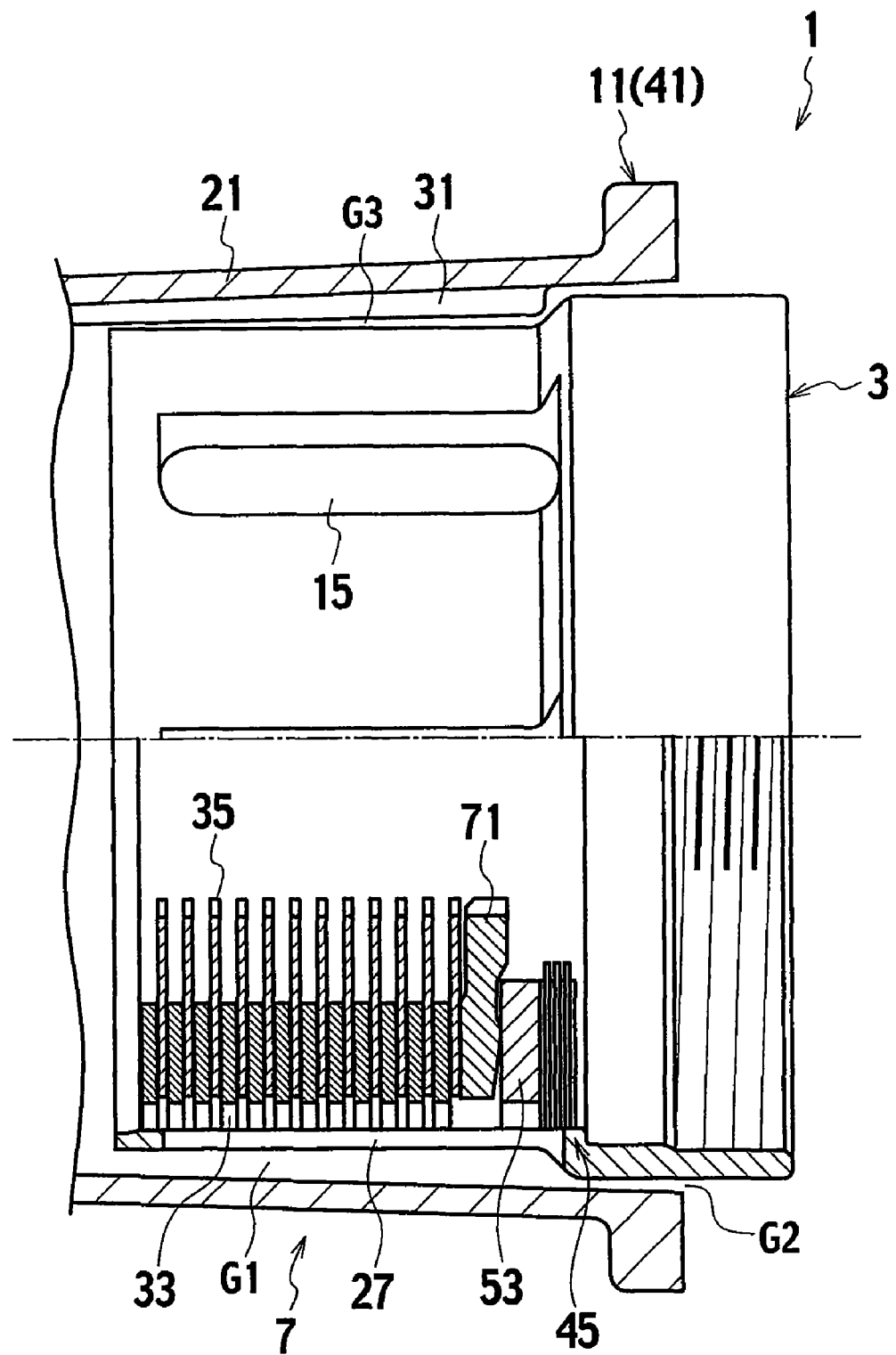
FIG. 2 is a partial sectional view (pattern A) of the torque transmission apparatus 1, showing a substantial part thereof.
Figure 3:
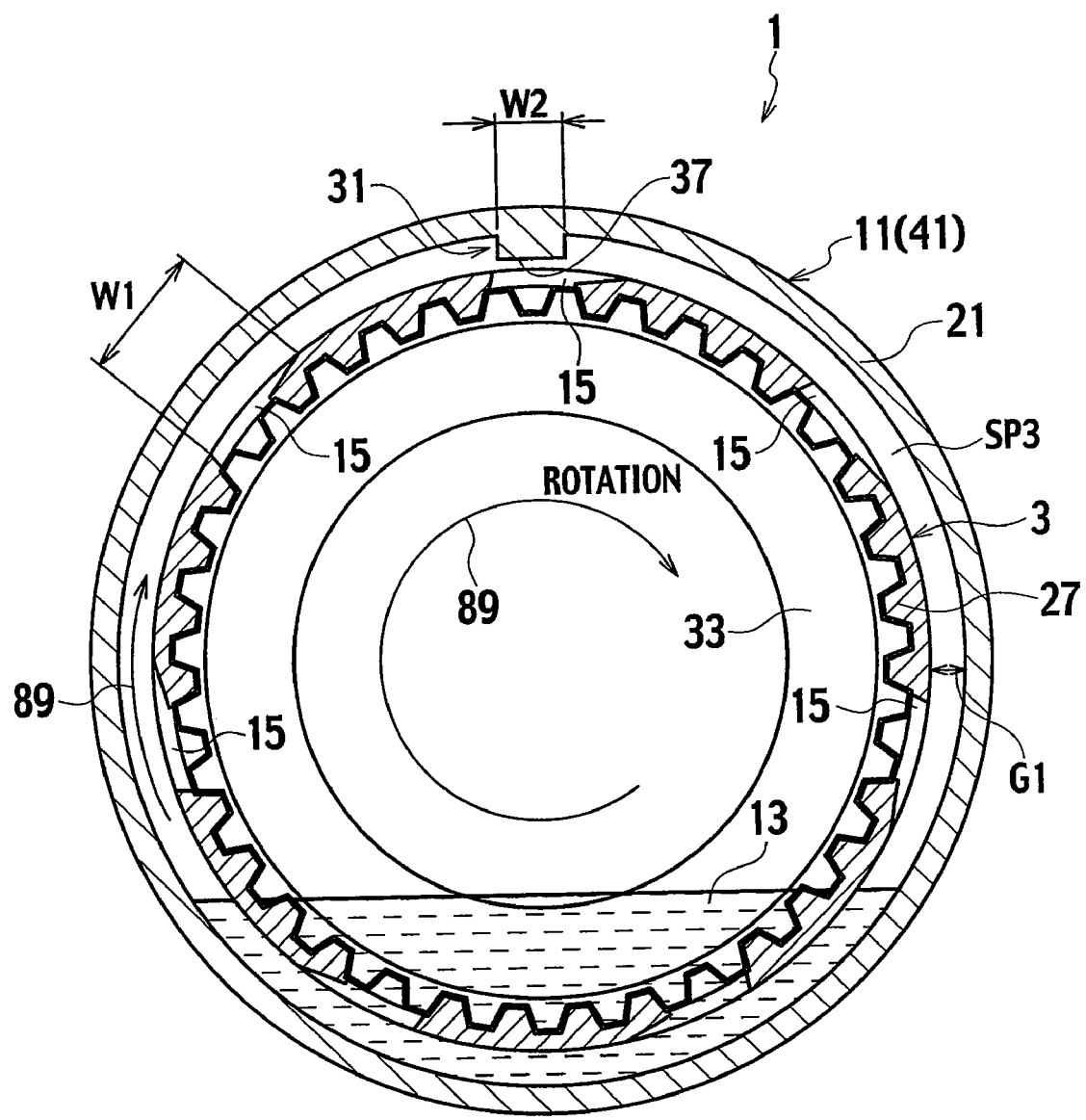
FIG. 3 is a longitudinal sectional view (pattern A) of the substantial part of the torque transmission apparatus 1.

As shown in FIG. 3, the rotating casing 3 rotates in the direction of arrow 89 during the vehicle's traveling. Then, between the circumferential walls 21 and 27, the oil 13 flows, due to its viscosity, rotationally upward in the vertical direction, along the circumferential wall 21. Subsequently, the oil 15 hits against the side face 32 of the protrusion 31 on the upside in the vertical direction, so that the flowing direction is changed radially inwardly. Regarding this directional change, owing to the above-mentioned arrangements of: narrowing the opposing gap G1 between the circumferential walls 21 and 27; making the protrusion 31 opposing the openings 15; and providing the narrow gap G2 by the large diameter part 39 so that the oil 13 is restrained from moving from the openings 15 to the right, it is possible to change the flowing direction of the oil 13 to the openings 15 effectively and also possible to introduce the oil 13 into the openings 15 while remaining the fluid power with the oil in rotation. Consequently, as shown in FIG. 2, the oil 13 is directly provided to the main clutch 7 (the plates 33, 35), the pilot clutch 45, the ball cam 47, the armature 53 and the others, all of which are exposed to outside through the openings 15, providing effective lubrication and cooling action on these elements.

Figure 4:
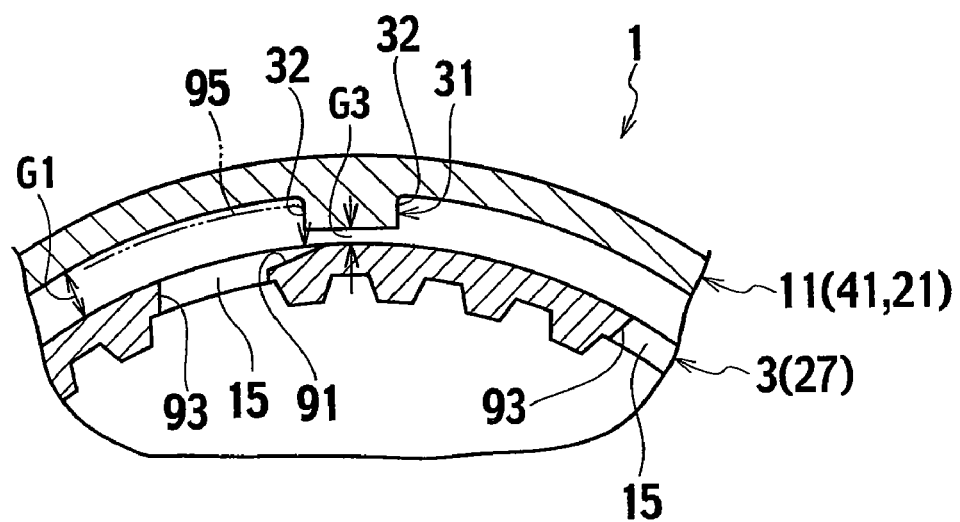
FIG. 4 is a partially-enlarged sectional view (pattern A) of the substantial part of the torque transmission apparatus 1.
Figure 5:
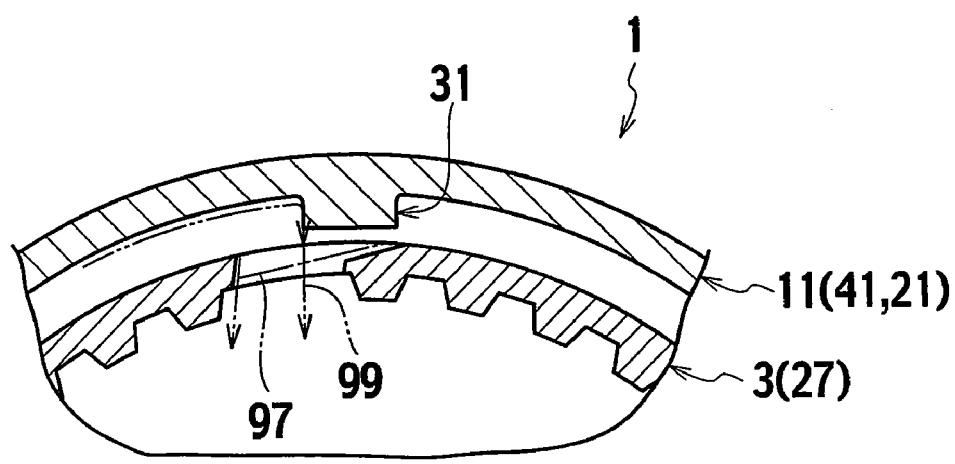
FIG. 5 is a partially-enlarged sectional view (pattern A) of the substantial part of the torque transmission apparatus 1.

As shown in FIG. 4, the opening 15 is provided with a leading face 91 precedent in the rotating direction of the oil 13 and a trailing face 93. The leading face 91 is greatly inclined to the rotating direction, while the trailing face 93 is slightly inclined to the same direction. The flow of the oil 13 flowing rotationally is changed radially inward since the oil 13 hits against the side face 32 of the protrusion 31, as shown with arrow 95 of FIG. 4. Then, as the corresponding gap G3 between the end face 37 of the protrusion 31 and the circumferential wall 27 is established to be remarkably narrower than the opposing gap G1 between the circumferential wall 21 and the circumferential wall 27, it can be ensured that the oil 13 hits against the side face 32 of the protrusion 31. The oil 13 directing radially inward while opposing the leading face 91 is introduced into the opening 15 since the oil 13 hits against the trailing face 15, as shown with arrow 97 of FIG. 5. Meanwhile, the oil 13 shown with arrow 99 is introduced into the opening 15 directly. Additionally, as the opening 15 is formed so that its width W1 in the rotating direction is wider than the width W2 of the end face 37 in the rotating direction, the flowage of the oil 13 against the openings 15 can be performed smoothly.

[Pattern B]

We now explain each opening 151 in the pattern B with reference to FIGS. 6 to 9.

Figure 7:
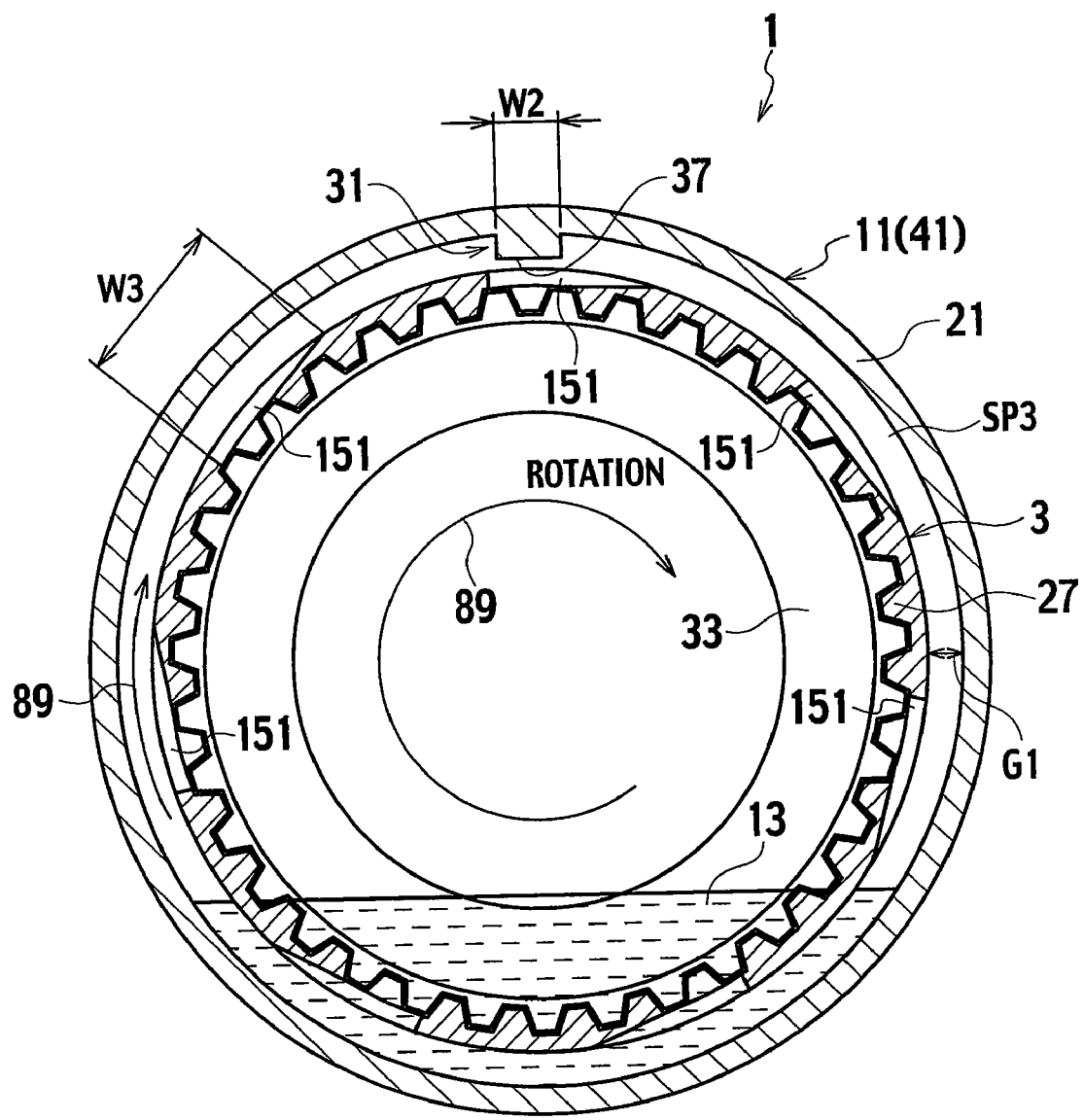
FIG. 7 is a longitudinal sectional view (pattern B) of the substantial part of the torque transmission apparatus 1.
Figure 8:
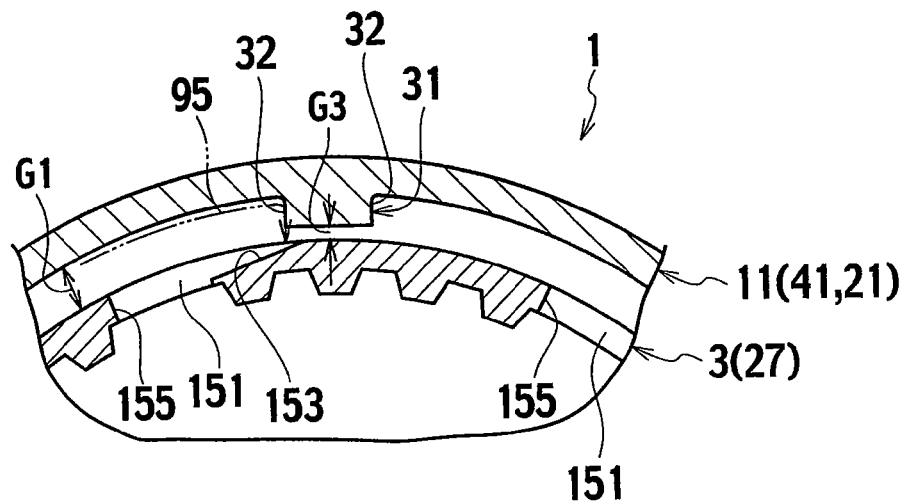
FIG. 8 is a partially-enlarged sectional view (pattern B) of the substantial part of the torque transmission apparatus 1.
Figure 9:
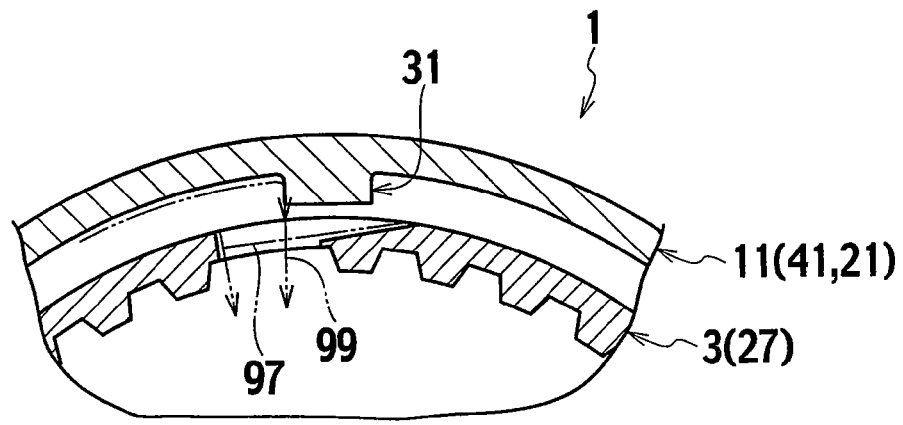
FIG. 9 is a partially-enlarged sectional view (pattern B) of the substantial part of the torque transmission apparatus 1.

As shown in FIG. 8, the opening 15 is provided with a leading face 153 precedent in the rotating direction of the oil 13 and a trailing face 155. Further, the leading face 153 is inclined greater than the leading face 91 of the opening 15, while the trailing face 155 is substantially directed to the center of the rotating casing 3. As shown in FIG. 7, the opening 151 is formed so that its width W3 in the rotating direction is wider than the width W2 of the opening 15 in the rotating direction.

Figure 6:
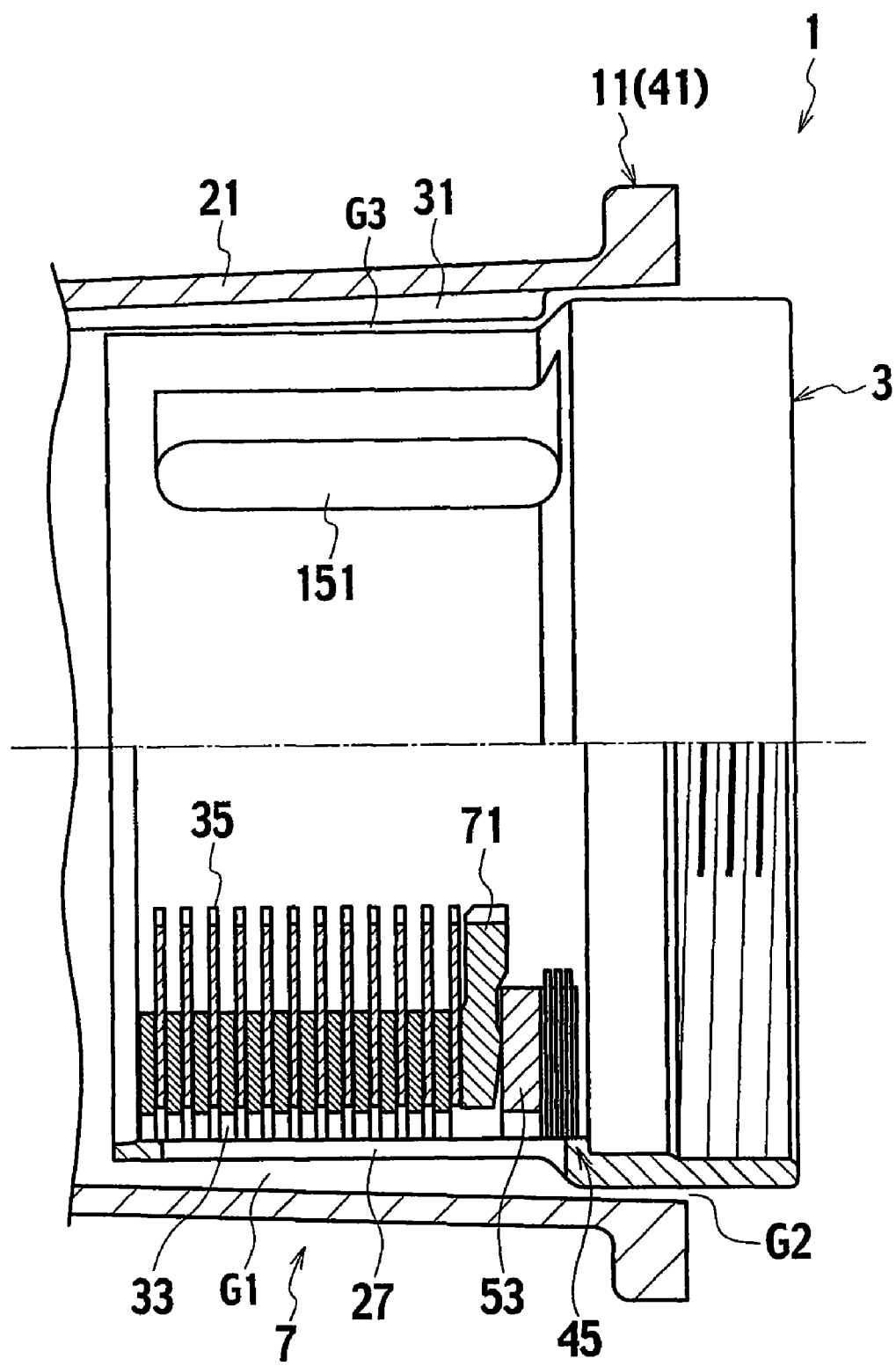
FIG. 6 is a partial sectional view (pattern B) of the substantial part of the torque transmission apparatus 1.

During the vehicle's traveling, the rotating casing 3 rotates in the direction of arrow 89. Then, between the circumferential walls 21 and 27, the oil 13 as a whole flows, due to its viscosity, rotationally upward in the vertical direction, along the circumferential wall 21. Subsequently, the oil 15 hits against the side face 32 of the protrusion 31 on the upside in the vertical direction, so that the flowing direction is changed radially inwardly. Regarding this directional change, owing to the above-mentioned arrangements of: narrowing the opposing gap G1 between the circumferential walls 21 and 27; making the protrusion 31 opposing the openings 151; and providing the narrow gap G2 by the large diameter part 39 so that the oil 13 is restrained from moving from the openings 151 to the right, it is possible to change the flowing direction of the oil 13 to the openings 151 effectively and also possible to introduce the oil 13 into the openings 151 while remaining the fluid power with the oil in rotation. Consequently, as shown in FIG. 6, the oil 13 is directly provided to the main clutch 7 (the plates 33, 35), the pilot clutch 45, the ball cam 47, the armature 53 and the others, all of which are exposed to outside through the openings 151, providing effective lubrication and cooling action on these elements.

The flow of the oil 13 flowing rotationally is changed radially inward since the oil 13 hits against the side face 32 of the protrusion 31, as shown with arrow 95 of FIG. 8. The oil 13 directing radially inward while opposing the leading face 153 is introduced into the opening 151 since the oil 13 hits against the trailing face 155, as shown with arrow 97 of FIG. 9. Meanwhile, the oil 13 shown with arrow 99 is introduced into the opening 151 directly. Additionally, as the opening 151 is formed so that the width W3 in the rotating direction is wider than the width W2 of the end face 37 in the rotating direction, the flowage of the oil 13 against the openings 151 can be performed smoothly.

[Pattern C]

We now explain each opening 201 in the pattern C with reference to FIGS. 10 to 13.

Figure 10:
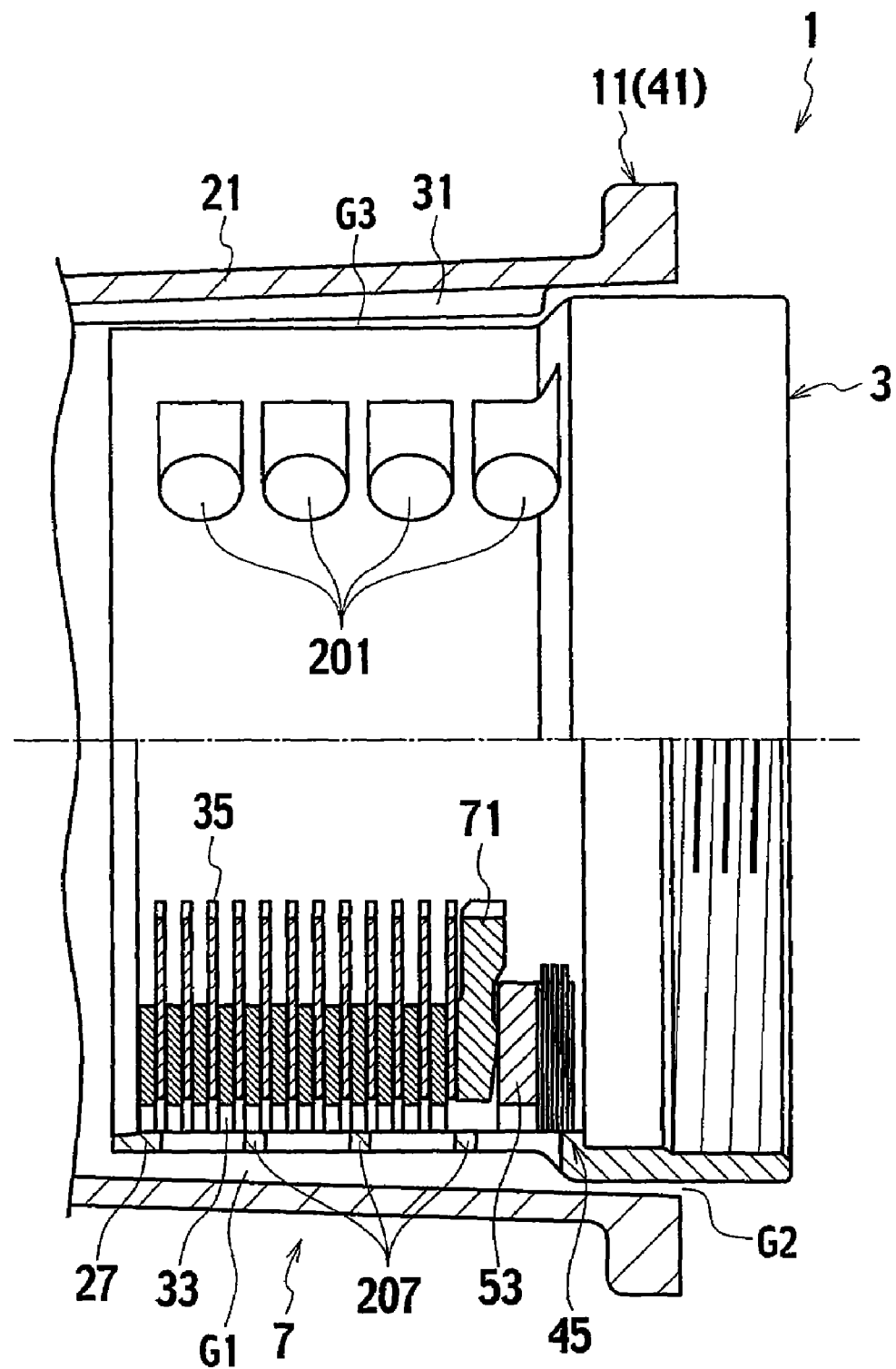
FIG. 10 is a partial sectional view (pattern C) of the substantial part of the torque transmission apparatus 1.
Figure 11:
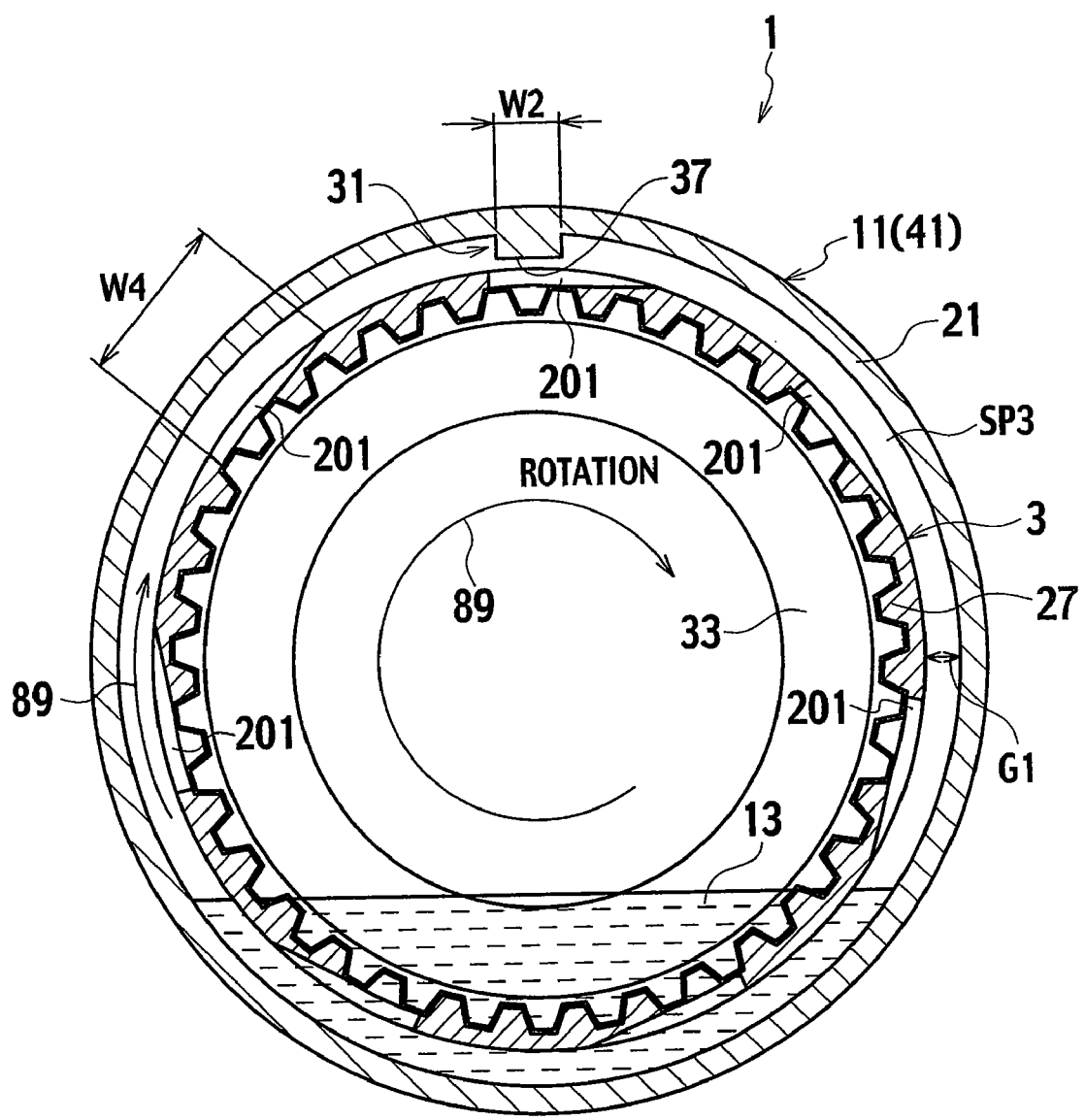
FIG. 11 is a longitudinal sectional view (pattern C) of the substantial part of the torque transmission apparatus 1.
Figure 12:
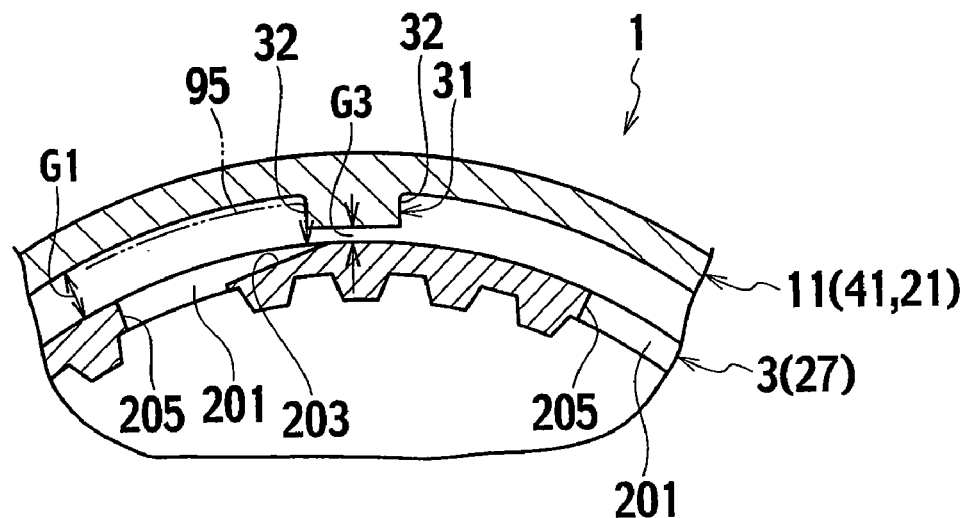
FIG. 12 is a partially-enlarged sectional view (pattern C) of the substantial part of the torque transmission apparatus 1.
Figure 13:
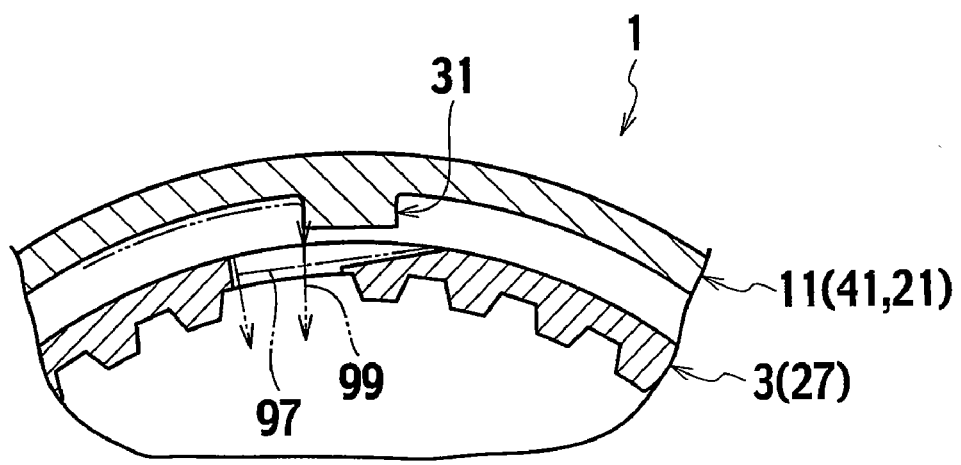
FIG. 13 is a partially-enlarged sectional view (pattern C) of the substantial part of the torque transmission apparatus 1.

As shown in FIG. 10, each of the openings 201 is shaped to be circular. There are provided four openings 201 at regular intervals in the axial direction. As shown in FIG. 12, each opening 201 is provided with a leading face 203 precedent in the rotating direction of the oil 13 and a trailing face 205. The leading face 203 is inclined greater than the leading face 91 of the opening 15, while the trailing face 205 is substantially directed to the center of the rotating casing 3. As shown in FIG. 11, the opening 201 is formed so that its width W4 in the rotating direction is wider than the width W2 of the end face 37 of the protrusion 31 in the rotating direction.

During the vehicle's traveling, the rotating casing 3 rotates in the direction of arrow 89. Then, between the circumferential walls 21 and 27, the oil 13 as a whole flows, due to its viscosity, rotationally upward in the vertical direction, along the circumferential wall 21. Subsequently, the oil 15 hits against the side face 32 of the protrusion 31 on the upside in the vertical direction, so that the flowing direction is changed radially inwardly. Regarding this directional change, owing to the above-mentioned arrangements of: narrowing the opposing gap G1 between the circumferential walls 21 and 27; making the protrusion 31 opposing the openings 201; and providing the narrow gap G2 by the large diameter part 39 so that the oil 13 is restrained from moving from the openings 201 to the right, it is possible to change the flowing direction of the oil 13 to the openings 201 effectively and also possible to introduce the oil 13 into the openings 201 while remaining the fluid power with the oil in rotation. Consequently, as shown in FIG. 10, the oil 13 is directly provided to the main clutch 7 (the plates 33, 35), the pilot clutch 45, the ball cam 47, the armature 53 and the others, all of which are exposed to outside through the openings 201, providing effective lubrication and cooling action on these elements.

The flow of the oil 13 flowing rotationally is changed radially inward since the oil 13 hits against the side face of the protrusion 31, as shown with arrow 95 of FIG. 12. The oil 13 directing radially inward while opposing the leading face 203 is introduced into the opening 201 since the oil 13 hits against the trailing face 205, as shown with arrow 97 of FIG. 13. Meanwhile, the oil 13 shown with arrow 99 is introduced into the opening 201 directly. Additionally, as the opening 201 is formed so that the width W3 in the rotating direction is wider than the width W2 of the end face 37 in the rotating direction, the flowage of the oil 13 against the openings 201 can be performed smoothly.

[Pattern D]

We now explain each opening 251 in the pattern D with reference to FIGS. 14 to 17.

Figure 15:
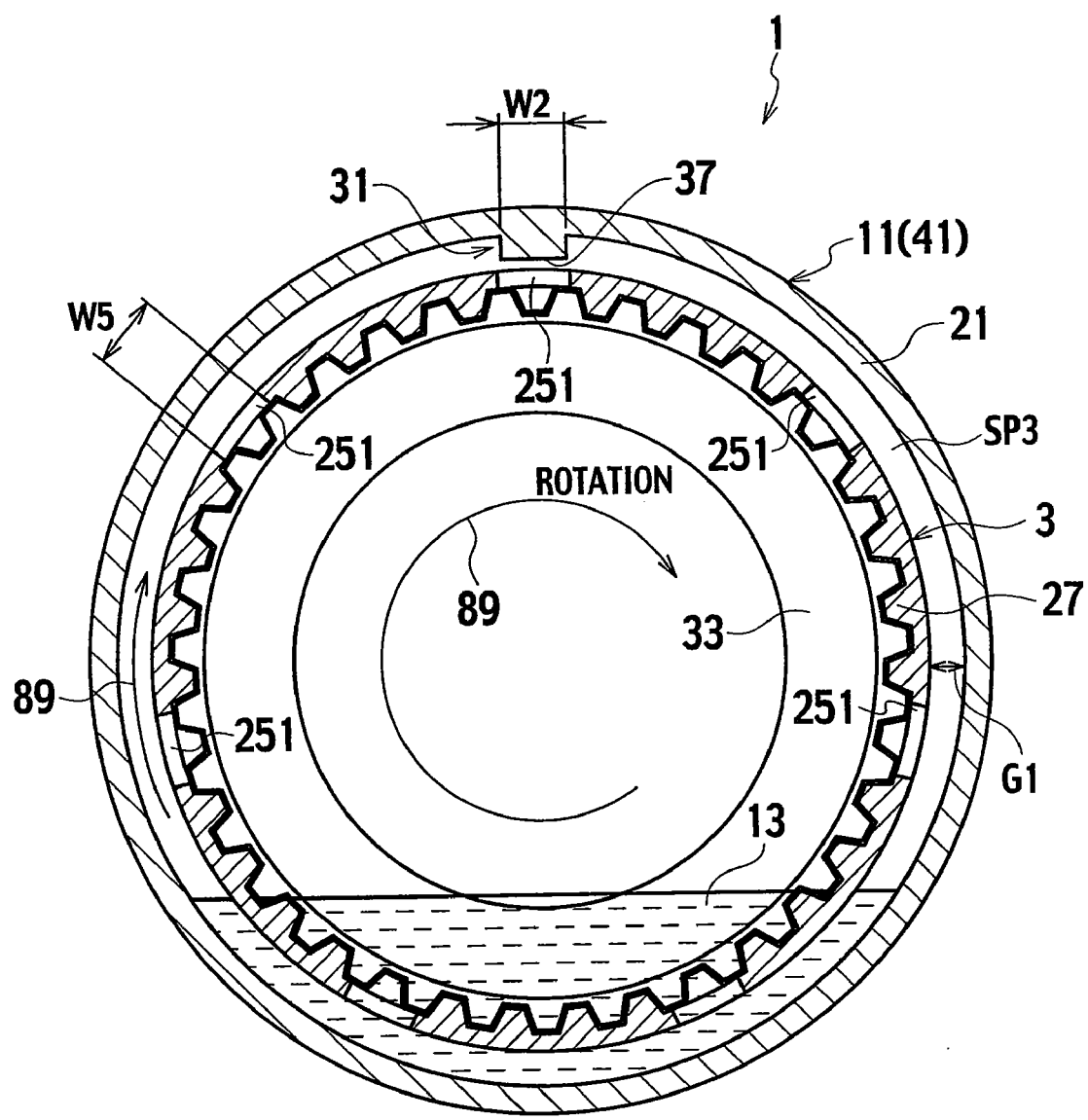
FIG. 15 is a longitudinal sectional view (pattern D) of the substantial part of the torque transmission apparatus 1.
Figure 16:
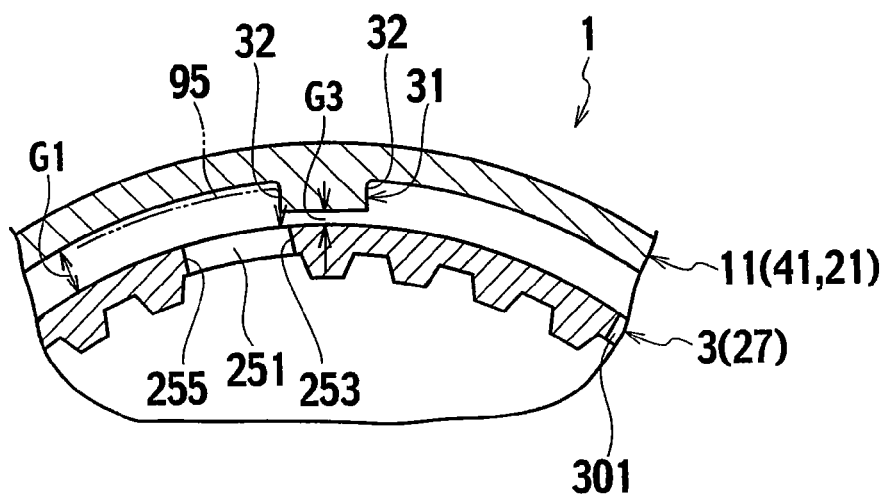
FIG. 16 is a partially-enlarged sectional view (pattern D) of the substantial part of the torque transmission apparatus 1.
Figure 17:
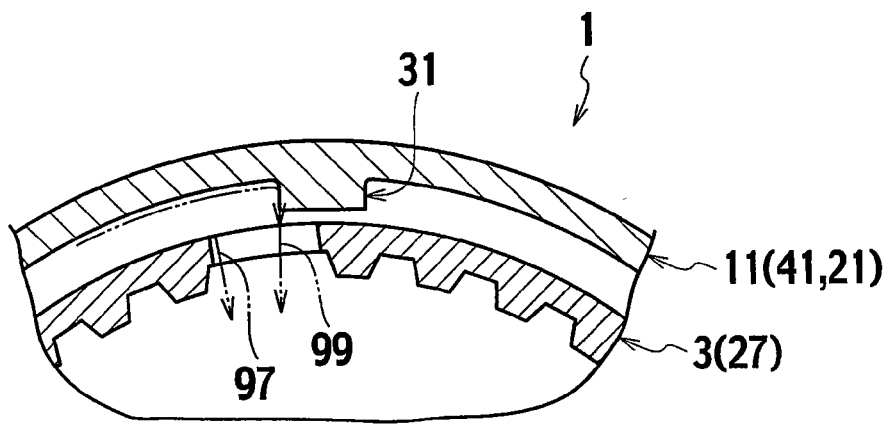
FIG. 17 is a partially-enlarged sectional view (pattern D) of the substantial part of the torque transmission apparatus 1.

As shown in FIG. 16, the opening 251 is provided with a leading face 253 precedent in the rotating direction of the oil 13 and a trailing face 255. Further, both of the leading faces 253, 255 are formed so as to face the center of the rotating casing 3 substantially. As shown in FIG. 15, the opening 251 is formed so that its width W5 in the rotating direction is wider than the width W2 of the end face 37 of the protrusion 31 in the rotating direction.

Figure 14:
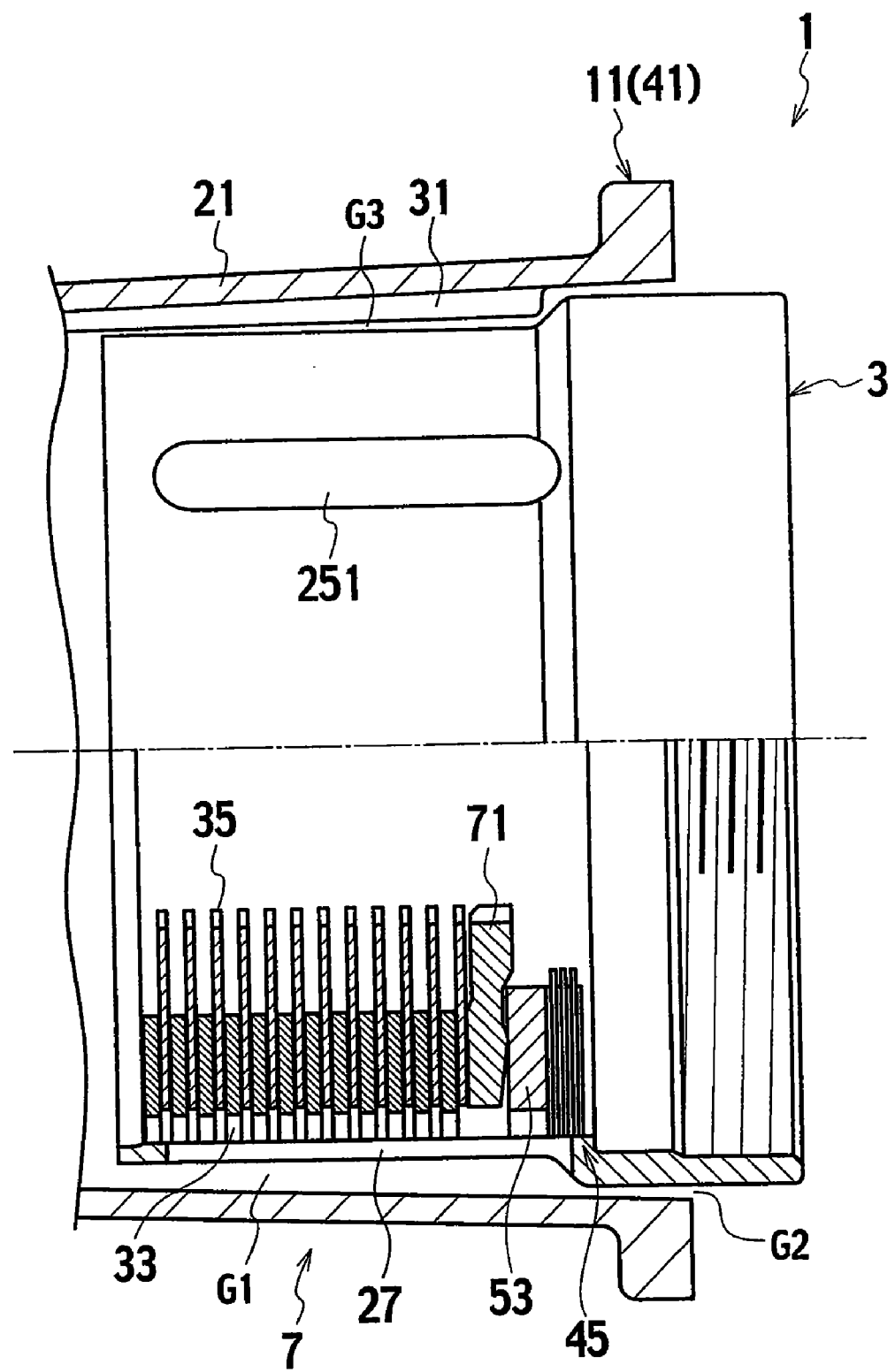
FIG. 14 is a partial sectional view (pattern D) of the substantial part of the torque transmission apparatus 1.

During the vehicle's traveling, the rotating casing 3 rotates in the direction of arrow 89. Then, between the circumferential walls 21 and 27, the oil 13 as a whole flows, due to its viscosity, rotationally upward in the vertical direction, along the circumferential wall 21. Subsequently, the oil 15 hits against the side face 32 of the protrusion 31 on the upside in the vertical direction, so that the flowing direction is changed radially inwardly. Regarding this directional change, owing to the above-mentioned arrangements of: narrowing the opposing gap G1 between the circumferential walls 21 and 27; making the protrusion 31 opposing the openings 251; and providing the narrow gap G2 by the large diameter part 39 so that the oil 13 is restrained from moving from the openings 251 to the right, it is possible to change the flowing direction of the oil 13 to the openings 251 effectively and also possible to introduce the oil 13 into the openings 251 while remaining the fluid power with the oil in rotation. Consequently, as shown in FIG. 14, the oil 13 is directly provided to the main clutch 7 (the plates 33, 35), the pilot clutch 45, the ball cam 47, the armature 53 and the others, all of which are exposed to outside through the openings 251, providing effective lubrication and cooling action on these elements.

The flow of the oil 13 flowing rotationally is changed radially inward since the oil 13 hits against the side face 32 of the protrusion 31, as shown with arrow 95 of FIG. 16. The oil 13 directing radially inward while opposing the leading face 253 is introduced into the opening 251 since the oil 13 hits against the trailing face 255, as shown with arrow 97 of FIG. 17. Meanwhile, the oil 13 shown with arrow 99 is introduced into the opening 251 directly. Additionally, as the opening 251 is formed so that the width W5 in the rotating direction is wider than the width W2 of the end face 37 in the rotating direction, the flowage of the oil 13 against the openings 251 can be performed smoothly.

FIG. 18 is a diagram showing the experimental result in measuring the oil introducing effects by the openings 15, 151, 201 and 251 in patterns A, B, C and D. FIG. 19 is a diagram showing the experimental result in measuring the oil introducing effects different from each other due to the presence of a protrusion and the positioning of the protrusion. The experiments of FIGS. 18 and 19 are carried out under condition that, at room temperature (20° C.) as the start temperature, the rotating casing 3 is rotated at a rotating speed (corres. 50 km/h) of a predetermined number of revolutions (240 rpm) for 5 minutes. In FIGS. 18 and 19, there are represented respective oil volumes introduced into the main clutch and the pilot clutch under the above condition, respective sums of these oil volumes and respective oil volumes introduced into respective parts in relation to the enclosed oil volumes L, in percentage terms respectively. Each volume of oil enclosed in the rotating casing 3 is generally a predetermined volume L (mL) excepting #4 of FIG. 19. The oil level where the oil 13 is enclosed by a predetermined volume L coincides with the levels of the inner circumference at the lower ends of the seals 79, 81. The rotating speed 240 rpm of the rotating casing 3 corresponds to a traveling speed of 50 km/h in a vehicle. Still further, in FIG. 19, number #3 corresponds to the pattern A of FIG. 18.

From FIG. 18, it will be understood that respective oil introducing volumes can be arranged, in decreasing order, in the patterns B, A, C and D, representing the lubrication and cooling effect in the coupling 9 being enhanced.

As shown in FIG. 19, it is also found that the arrangement with no protrusion (#1) exhibits an insufficient amount of introduced oil and insufficient lubrication and cooling effect; the arrangement #2 where the protrusion is not formed on the upside in the vertical direction does not exhibit such a sufficient oil introducing volume; and the arrangement #3 corresponding to the pattern A of FIG. 18 can exhibit a sufficient mount of introduced oil and sufficient lubrication and cooling effect.

Note: the arrangement of #4 suggest a fact that if the enclosed oil volume is increased in double to 2 L (mL), then the oil introducing volume and the lubrication and cooling effect can be enhanced furthermore.

[Effects of Torque Transmission Apparatus 1]

With the above-mentioned constitutions, the torque transmission apparatus 1 has the following effects.

As the enclosed oil 13 is cooled down by its contact with the stationary housing 11, the torque transmission apparatus 1 has an improved cooling capability.

Additionally, as the so-cooled oil 13 is introduced into the coupling 9 through the openings 15, the reduction in transmitting torque is suppressed.

Again, as the oil 13 is difficult to be elevated in temperature, the deterioration of the oil 13 by heat is suppressed to improve the durability of the coupling 9.

Still further, as the oil 13 rotationally flows between the circumferential walls 21 and 27 (establishment of an interval between the walls 21 and 27 so as to allow the oil 13 to be accompanied with a relative rotation between the walls 21 and 27), it is possible to introduce the oil 13 into the openings 15 in comparison with an arrangement for simply stirring the oil 13, quickly and efficiently.

Again, owing to the upward flowage of the oil in the vertical direction, it is possible to supply the oil 13 to the openings 15 in required places from the upside effectively.

Additionally, as the rotating power produced in the oil 13 due to its rotational flowage between the circumferential walls 21 and 27 is remained as a fluid power until it is introduced into the openings 15, it is possible to improve the lubrication effect by forcibly introducing the oil 13 into the openings 15 with the use of the fluid power.

Again, with the establishment of the narrow opposing gap G1 between the circumferential walls 21 and 27, it is possible to change the flowing direction of the oil 13 to the openings 15 effectively.

Further, since the side face 32 (a surface opposed to the circumferential direction) of the protrusion 31 collides with the oil 13 to change its rotational flowing to the radial direction, it is possible to introduce the oil 13 into the openings 15 opposed to the radial direction, effectively.

Further, as the arrangement where the protrusion 31 is arranged on the upside in the vertical direction causes an increase in the degree of freedom in streaming the oil 13 from the protrusion 31 toward the openings 15, the restrictions in positioning the openings 15 are alleviated as much.

Additionally, it is possible to allow the oil 13, whose flowing direction has been changed by the protrusion 31, to flow into the opening 15 opposed to the protrusion 31 directly.

Again, as the oil 13 is directly supplied to the main clutch 7 (the plates 33 and 35), the pilot clutch 45 and the ball cam 47, all of which are exposed through the openings 15, it is possible to lubricate and cool down these elements effectively.

Further, even if the flowage of the oil 13 is restricted by the end face 37 of the protrusion 31, there is no possibility of exerting an influence on the flowage of the oil 13 against the openings 15 since the width W1 of each opening 15 in the rotating direction is broader than the width W2 of the end face 37 in the rotating direction.

Further, as the circumferential wall 21 of the stationary housing 11 is formed so as to increase in diameter gradually, it is possible to allow the oil 13 in rotational flowage to be moved to the direction to increase the diameter (i.e. right direction) due to a centrifugal force of the oil.

Again, owing to the provision of the large diameter part 39 in the rotating casing 3, it is possible to make the oil 13 flowing against the openings 15 with a restriction to the flowing of the oil 13 apart from the openings 15.

Additionally, since the stationary housing 11 is formed in block construction, the establishment in profile of the openings 15 and their arrangement are facilitated as much.

Additionally, as mentioned above, since two or more functional parts [i.e. the main clutch 7 (the plates 33 and 35), the pilot clutch 45, the ball cam 47 and the armature 53] can be exposed through the openings 15, it is possible to lubricate and cool down the apparatus extensively as much.

($2^{nd}$. Embodiment)

Referring to FIGS. 20 to 23 and FIG. 24, a torque transmission apparatuses 301 will be described. FIG. 24 is a skeleton structural view showing a power system of a vehicle equipped with the torque transmission apparatus 301. In this figure, a left-and-right direction coincides with a left-and-right direction of this vehicle.

[Constitution of Torque Transmission Apparatus 301]

The torque transmission apparatuses 301 includes the coupling 9 having the rotating casing 3 (the first torque transmission member), the hub 5 (the second torque transmission member), the power transmitting shaft 67 (the second torque transmission member) spline-connected to the hub so as to rotate integrally therewith and the main clutch 7 (the frictional clutch) for transmitting a torque between the rotating casing 3 and the hub 5, the stationary hosing 11 accommodating the coupling 9, the oil 13 enclosed in the stationary housing 11 and an opening 303 as an annular space, which is formed in a part of the coupling 9 so that the oil 13 in the stationary housing 11 is introduced into the coupling 9.

Again, the stationary housing 11 includes the first radial sidewall 17, the second radial sidewall 19 and the first circumferential wall 21 connecting the first and second sidewalls 17, 19 with each other. The rotating casing 3 includes the third radial sidewall 23, the fourth radial sidewall 25 and the second circumferential sidewall 27 connecting the third and fourth sidewalls 23, 25 with each other. The coupling 9 includes the electromagnet coil 51 (the actuator) for fastening the main clutch 7. The annular electromagnet coil 51 is arranged between the sidewalls 19 and 25 and also fixed to the sidewall 19 so as to be unable to rotate in relation to the sidewall 19. The first circumferential wall 21 is provided, on an upper part thereof in the vertical direction, with a protrusion 305 that extends in the direction of a rotating axis of the rotating casing 3 and also includes a left-end side (one end side) and a right-end side (the other end side) opened to outside. The protrusion 305 comprises a separate body from the stationary housing 11 (i.e. the circumferential wall 21) and is fixed on the inner circumference of the circumferential wall 21. The first circumferential wall 21 is formed so as to gradually increase its diameter from a left-end side of the rotating casing 3 in the axial direction to the right side. The oil 13 is enclosed in a spatial part 313 surrounded by the sidewalls 17, 23, the side walls 19, 25 and the circumferential walls 21, 27, by a predetermined volume.

The spatial part 313 comprises a first spatial part SP11 defined by the first radial sidewall 17 and the third radial sidewall 23, a second spatial part SP12 (i.e. the opening 303) defined by the second radial sidewall 19 and the fourth sidewall 25 and a third spatial part SP13 defined by the first circumferential wall 21 and the second circumferential wall 27.

The third spatial part SP13, which has a coaxial and double-annular structure along the axial direction of the rotating casing 3, is adapted so that the first circumferential wall 21 and the second circumferential wall 27 form a predetermined narrow opposing gap G4. With the establishment of this opposing gap G4 as a narrow gap, when the rotating casing 3 rotates, the oil 13 moves along an inner circumferential surface of the first circumferential wall 21 upward in the vertical direction in opposition to oil's own weight, effecting the rotational flowage of the oil as a whole. Then, the oil moves upward in the vertical direction along the inner circumferential surface of the first circumferential wall 21 while remaining a fluid power due to the rotation.

The protrusion 305 has a structure (first oil flow path 307) opening in the rotating direction of the oil 13 and extending along the axial direction of the rotating casing. Again, the protrusion 305 includes a side face 311 as an oil barrier to convert the fluid power of the oil 13, which rotationally flows between the circumferential walls 21 and 27 due to the rotation of the rotating casing, from the rotating direction to the axial direction, and a bottom face 308 for leading the oil 13, whose flowing direction has been converted from the rotating direction to the axial direction, to the right-end side. The side face 311 of the protrusion 305 converts the fluid power of the oil 13, which is rotationally flowing between the circumferential walls 21 and 27 due to the rotation of the rotating casing, from the rotating direction and the axial direction thereby to introduce the oil 13 into the opening 303. That is, the protrusion 305 not only functions as oil collecting means for collecting the oil 13 rotationally flowing between the circumferential walls 21 and 27 but acts as flowing-direction converting means for allowing the so-collected oil 13 to flow in the axial direction totally.

In detail, the protrusion 305 not only receives the oil 13 in rotational flowage thereby to make it flowing from the left-end side to the right-end side but also releases the oil 13 from the right-end side to an interval between the electromagnet coil 51 and the sidewall 19 thereby to introduce the oil 13 into the coupling 9 through the opening 303 between the inner circumferential side of the sidewall 25 and the outer circumferences of both the power transmitting shaft 67 and the hub 5.

Then, by establishing the corresponding gap G5 between the bottom face 308 of the protrusion 305 and the circumferential wall 27 so as to be remarkably narrower than the opposing gap G4 between the circumferential wall 21 and the circumferential wall 27, it is possible to allow the oil 13 to hit against the side face 311 of the protrusion 305 more certainly.

In the torque transmission apparatus 301, a flow path for the oil 13 comprises the third spatial part SP13 allowing the flowing of the oil 13 in the rotating direction 89, the first oil flow path 307 provided in the third spatial part SP13 to convert the flowing direction of the oil 13 from the rotating direction to the axial direction, a second oil flow path 309 provided in the stationary housing 11 to allow the oil 13 flowing in the axial direction to flow toward the opening 303 radially inward and a third oil flow path 310 provided in the actuator 59 to allow the oil 13 to flow toward the opening 303 radially inward. With the constitution, the oil 13 is introduced into the opening 303 while remaining the fluid power due to the rotational movement.

Figure 21:
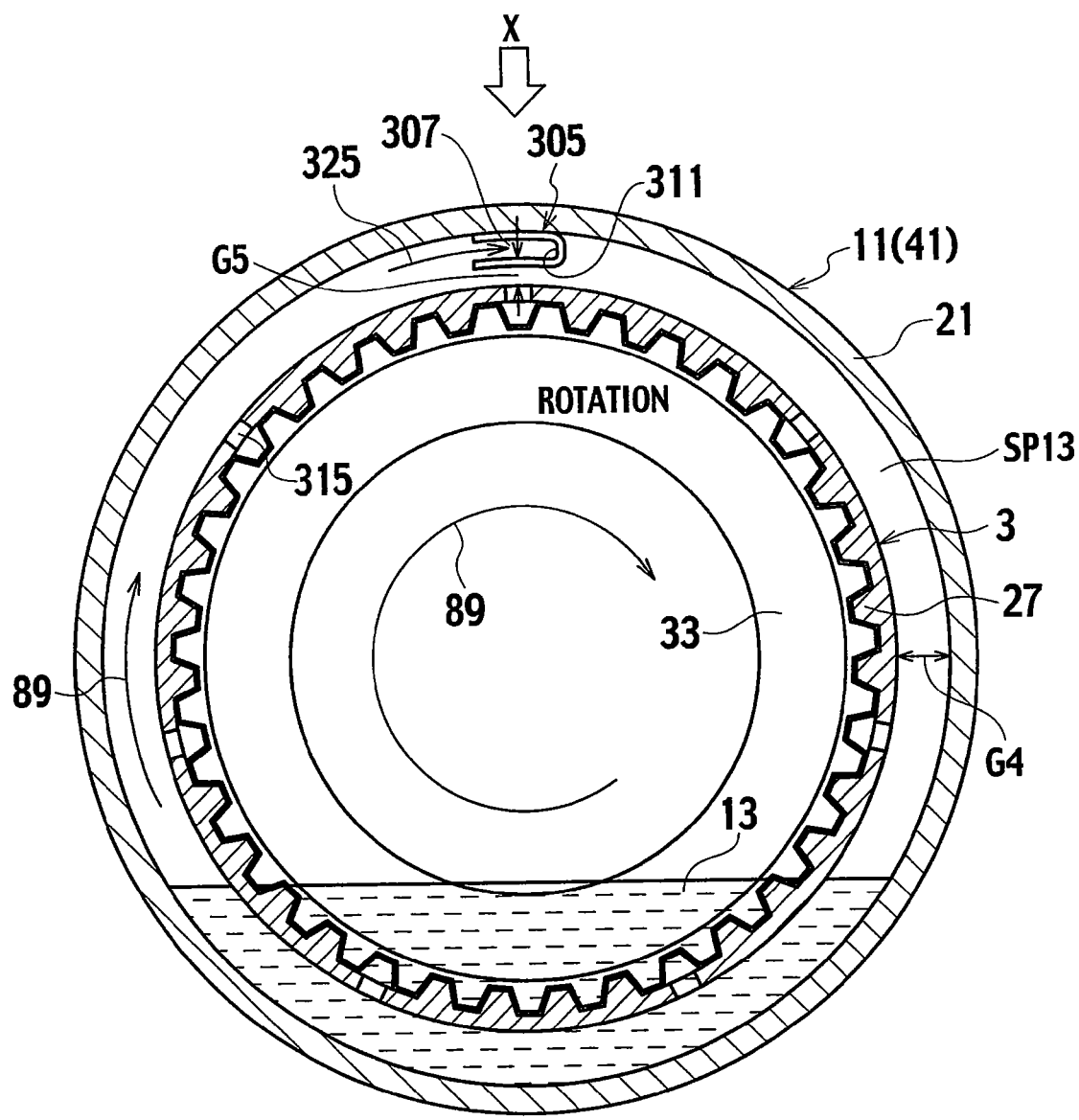
FIG. 21 is a partial sectional view of the torque transmission apparatus 301, showing a substantial part thereof.
Figure 22:
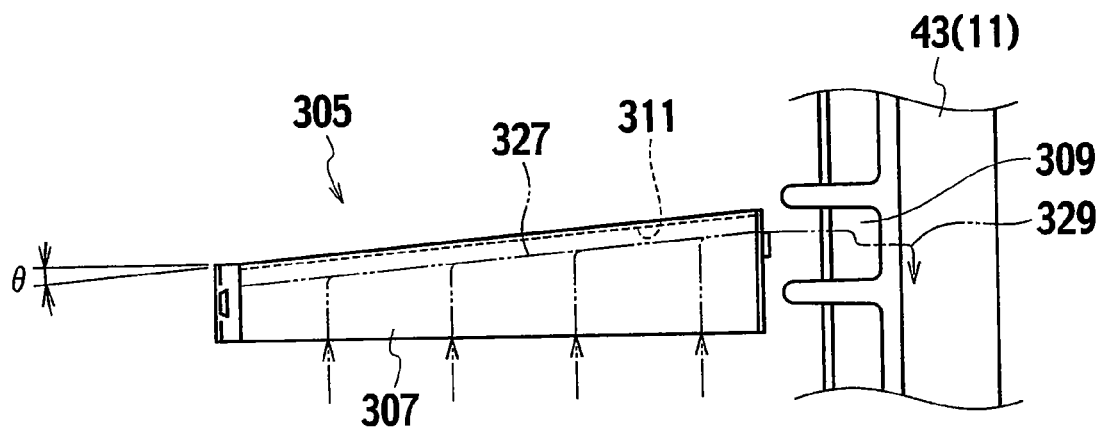
FIG. 22 is a view showing the flowing state of oil by a protrusion 305 of the torque transmission apparatus 301.
Figure 23:
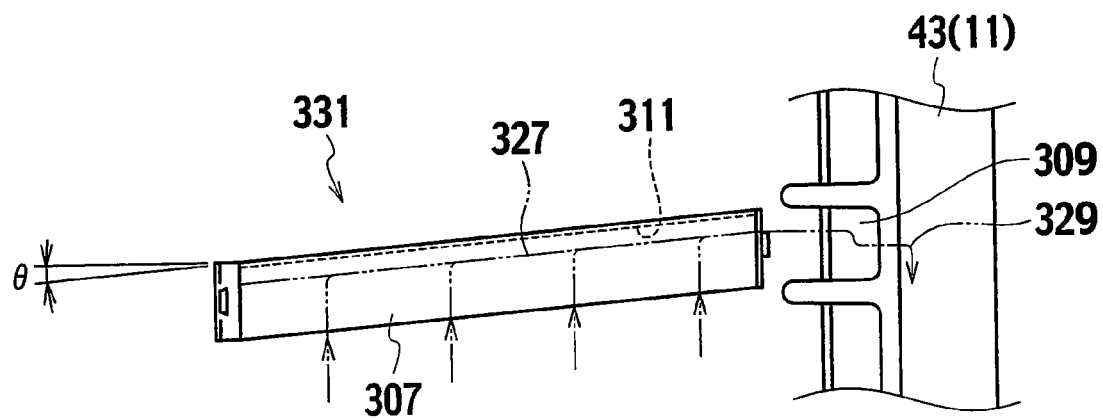
FIG. 23 is a view showing the flowing state of oil by a protrusion 331 of the torque transmission apparatus 301.

The side face 311 of the protrusion 305 is inclined from the axial direction of the rotating casing 3 to the rotating direction by an angle θ in view of converting the flowing direction of the oil 13 from the rotating direction to the axial direction (FIGS. 22 and 23: views in the direction X of FIG. 21).

The spatial part 313 is compartmentalized in the axial direction by the seals 79, 81 and 83. By forming a second opening (the second oil flow path 309, the third oil flow path 310) in at least either the sidewall 19 or the electromagnet coil 51, the right-end side of the protrusion 305 is communicated with the opening 303 (the second spatial part SP12).

The stationary housing 11 includes the first housing part 41 and the second housing part 43. On the inner circumferential side of the second circumferential wall 27, there are arranged: the main clutch 7 (the first frictional clutch) and the pilot clutch 45 (the second frictional clutch) as the frictional clutch; and the ball cam 47 (the cam mechanism) that converts a fastening force of the pilot clutch 45 to a cam thrust force (axial thrust) and also fastens the pilot clutch 45 by the cam thrust force.

[Constitution of Power System]

In the above-mentioned power system, as shown in FIG. 24, the driving force of the engine 1001 is transmitted: from the transmission 1003 to the reduction gear mechanism 1005; then from the reduction gear mechanism 1005 to the differential casing 1007; and then from the differential casing 1007 to the front differential 1009 and further distributed to the left and right front wheels 1015, 1017 through the axles 1011, 1013. While, the left and right rear wheels 1019, 1021 rotate with the traveling of the vehicle.

Since the rotating casing 3 is connected to the differential casing 1007 while the hub 5 is connected to the power transmitting shaft 67 (the second torque transmission member) forming a part of the right axle 1013, the torque transmission apparatus 301 functions as a limited-slip differential of the front differential 1009, as stated below.

[Constitution of Torque Transmission Apparatus 301]

In the stationary housing 11, the housing parts 41, 43 are fixed to each other by the bolts 49. A gasket is arranged between the housing parts 41 and 43. The coupling 9 accommodated in the stationary housing 11 comprises the armature 53, the controller etc. in addition to the rotating casing 3, the hub 5, the main clutch 7, the pilot clutch 45, the ball cam 47 and the electromagnet coil 51 (actuator).

In the rotating casing 3, its left end is supported by the stationary housing 11 through the both side-seal type ball bearing 55, while the right end is supported by the stationary housing 11 through the both side-seal type ball bearing 57 and the core 59 of the electromagnet coil 51. On the inner circumference of the left end of the rotating casing 3, the spline part 61 is formed to effect a spline connection with the differential casing 1007 of the front differential 1009. The circumferential wall 27 is provided with an opening 315 for draining the oil 13 due to a centrifugal force.

The hub 5 has left and right ends supported by the rotating casing 3 through the ball bearing 63 and the needle bearing 65, respectively. Nevertheless, even if eliminating the needle bearing 65, no functional problem would be caused. Again, the hub 5 comprises a hollow member through which the power transmitting shaft 67 forming a part of the right axle 1013 penetrates from side to side. In the main clutch 7, the outer plate 33 is spline-connected to the inner circumference of the rotating casing 3, while the inner plates 35 are spline-connected to the outer circumference of the hub 5. Each of the inner plates 35 is provided with the oil holes 101 that promote the movement of the oil 13, especially, enhance lubrication effect between the plates 33 and 35.

The ball cam 47 is interposed between the cam ring 69 and the pressure plate 71. The cam ring 69 is supported on the outer circumference of the hub 5 so as to be rotatable relatively to it. The pressure plate 71 is spline-connected to the outer circumference of the hub 5 so as to be axially movable to it. The bearing 73 is arranged between the cam ring 69 and the sidewall 25 to receive a cam reaction force of the ball cam 47. The armature 53 is arranged between the pilot clutch 45 and the pressure plate 71 and also spline-connected to the inner circumference of the rotating casing 3 so as to be axially movable to it. The sidewall 25 is screw-engaged with the left end of the circumferential wall 27 and axially positioned by the nut 75 functioning as a double-nut locking member. In the electromagnet coil 51, the core 59 is whirl-stopped to the stationary housing 11 by the pin 77.

The seal 79 is interposed between the left end of the stationary housing 11 and the rotating casing 3 to compart an oil lubrication space on the side of the transmission 1003 from an oil lubrication space on the side of the torque transmission apparatus 1, while the seal 81 is interposed between the right end of the stationary housing 11 and the power transmitting shaft 67 to compart the oil lubrication space on the side of the torque transmission apparatus 1 from the atmospheric space, both preventing a leakage of the oil 13 and an invasion of foreign matter. Further, the X-ring 83 as a seal having an X-shaped cross section is arranged between the power transmitting shaft 67 and the left end of the rotating casing 3.

The controller carries out the operations of exciting the electromagnet coil 51, controlling an exciting current, stopping the excitation and so on. When the electromagnet coil 51 is excited by the controller, the armature 53 is attracted to fasten the pilot clutch 45. Consequently, the ball cam 47 on receipt of torque operates to produce a cam thrust force. Due to the cam thrust force, the pressure plate 71 presses the main clutch 7 for its fastening. By this fastening force, the differential rotation in the front differential 1009 (i.e. rotation between the front wheels 1015, 1017) is limited. Then, if the controller controls the exciting current, the cam thrust force of the ball cam 47 is changed due to a slipping of the pilot clutch 45, allowing the limited-slip differential force of the main clutch 7 to be adjusted. For instance, if enhancing the fastening force of the pilot clutch 45, then the main clutch 7 is strongly fastened by the ball cam 47, allowing the differential motion of the front differential 1009 to be locked up.

Meanwhile, if the excitation of the electromagnet coil 51 is stopped, then the main clutch 7 is released, so that the differential motion of the front differential 1007 gets unrestrained.

The sidewall 25 is provided, on its inner circumference, with a spiral groove 319 as an oil introducing part for leading the oil 13 from the opening 303. Similarly, an oil groove 321 is formed on the outer circumference of the hub 5 to lead the oil 13 introduced from the opening 303 to the ball cam 47. Note: the spiral groove 319 may be formed by either a one-way spiral groove or an "intersecting" both-way (lattice type) spiral groove. Alternatively, as shown with broken line, the sidewall may be formed with a slanted groove 323 that is gradually enlarged in the radial direction as directing from the side of the opening 303 to the inside of the rotating casing 3.

Figure 20:
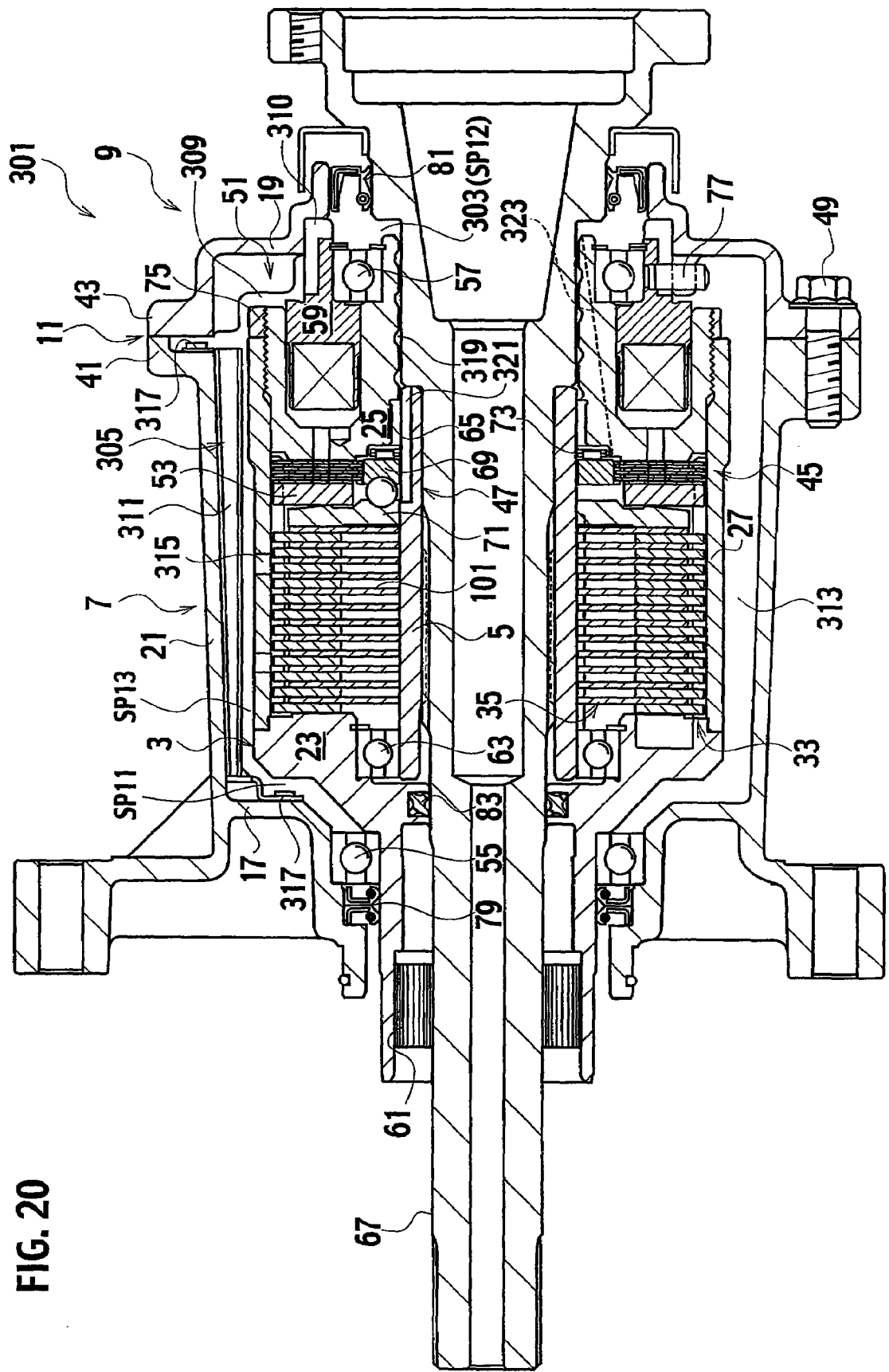
FIG. 20 is a sectional view of a torque transmission apparatus 301 in accordance with a second embodiment of the invention.

As shown in FIG. 20, the protrusion 305 is fixed, at both ends thereof, to the stationary housing 11 (the housing part 41) by screws 317, 317. As shown in FIG. 22, the protrusion 305 is formed so as to gradually increase its width in the rotating direction toward the right-end side. In operation, as shown in FIG. 21, when the vehicle is traveling, the rotating casing 3 rotates in the direction of arrow 89, while the oil 13 rotationally flows between the circumferential walls 21 and 27 (the third spatial part SP13) due to its viscosity and along the circumferential wall 21 upward in the vertical direction, as shown with arrow 325. Then, the oil 13 is collected by the side face 311 of the protrusion 305 fixed on an upper part of the wall in the vertical direction. Successively, as shown with arrow 327 of FIG. 22, the flowing direction of the oil 13 is converted from the rotating direction to the axial direction, so that the oil 13 flows in the first flow path 307 rightward, at the inclination angle θ. Further, as shown with arrow 329, the oil 13 from the right side of the housing flows radially inward through the second flow path 309. While remaining the fluid power, subsequently, the oil 13 is introduced into the opening 303 forcibly and also supplied from the oil groove 321 to the inside of the coupling 9. In this way, the oil 13 lubricates and cools down the ball cam 47, the pilot clutch 45, the armature 53, the main clutch 7 (the plates 33, 35) and so on.

FIG. 23 shows another protrusion 331. Similarly to the protrusion 305, the protrusion 331 has its side face 311 inclined at the inclination angle θ. The protrusion 331 differs from the protrusion 305 in that the former is formed, along the axial direction, with a constant width in the rotating direction.

The protrusion 331 can carry out a function of collecting oil, which is similar to that of the above-mentioned protrusion 305.

[Effects of Torque Transmission Apparatus 301]

With the above-mentioned constitutions, the torque transmission apparatus 301 has the following effects.

As the enclosed oil 13 is cooled down by its contact with the stationary housing 11, the torque transmission apparatus 301 has an improved cooling capability.

Additionally, as the so-cooled oil 13 is introduced into the coupling 9 through the opening 303, the reduction in transmitting torque is suppressed.

Again, as the oil 13 is difficult to be elevated in temperature, the deterioration of the oil 13 by heat is suppressed to improve the durability of the coupling 9.

Still further, as the oil 13 rotationally flows between the circumferential walls 21 and 27 (establishment of an interval between the walls 21 and 27 so as to allow the oil 13 to be accompanied with a relative rotation between the walls 21 and 27), it is possible to introduce the oil 13 into the opening 303 in comparison with an arrangement for simply stirring the oil 13, quickly and efficiently.

Again, by allowing the oil 13 to rotationally flow between the circumferential walls 21 and 27, the rotational flowage of the oil 13 can be attained in comparison with an arrangement for simply stirring the oil 13, rapidly and effectively. Further, owing to the provision of the protrusions 305, 331, it is possible to convert this rotational flowage to an axial flowage and also possible to introduce the oil into the opening 303 through the side of the right end.

In this way, as the circulation route of the oil 13 with respect to the coupling 9 equipped with the electromagnet coil 51 is established by: allowing the oil 13 to rotationally flow between the circumferential walls 21 and 27 thereby to attain rapid and effective rotational flowage in comparison with an arrangement for simply stirring the oil 13; converting this rotational flowage to the axial flowage by the protrusions 305, 331 and sequentially the radially-inward flowage by the second oil flow path 309; and releasing/introducing the oil 13 to the opening 303, it is possible to lubricate and cool down peripheral members including the electromagnet coil 51 certainly.

Additionally, as the rotating power produced in the oil 13 due to the rotational flowage between the circumferential walls 21 and 27 is remained as a fluid power until it is introduced into the opening 303, it is possible to improve the lubrication and cooling effect by introducing the oil 13 into the opening 303 by the fluid power forcibly.

Further, as the arrangement where the protrusions 305, 331 are commonly arranged on the upside in the vertical direction causes an increase in the degree of freedom in streaming the oil 13 from the protrusions 305, 331 toward the opening 303, the restrictions in positioning the opening 303 are alleviated as much.

Further, as the circumferential wall 21 is formed so as to increase its diameter gradually, it is possible to allow the oil 13 in rotational flowage to be moved to a direction to increase the diameter (i.e. right direction) due to a centrifugal force of the oil.

Again, as the protrusions 305, 331 are commonly inclined at the inclination angle θ, the rotating power of the oil 13 in rotational flowage can be converted to an axial power toward the opening 303 smoothly.

Again, as the protrusions 305, 331 are formed by different bodies from the stationary housing 11, the determination in the shape of the protrusions is facilitated to carry out the fabrication at a lower price as much.

Since the oil 13 is collected by the side faces 311 of the protrusions 305, 331, it is possible to transfer the oil 13 toward the opening 303 certainly.

The oil 13 can be reserved in the spatial part 313 defined by the electromagnet coil 51, the stationary housing 11 and the seals 79, 81 and 83. As the third spatial part SP13 of the spatial part 313 faces the opening 303 (the second spatial part SP12), it is possible to make the oil 13 flowing from the third spatial part SP13 to the opening 303 (the second spatial part SP12) easily.

Again, as the provision of the second opening (the second oil flow path 309, the third oil flow path 310) allows the formation of an oil passage for the opening 303, it is possible to attain a smooth flowage of the oil 13 toward the opening 303 by cogitating both the second oil flow path 309 and the third oil flow path 310 in terms of their configurations.

Additionally, since the stationary housing 11 is formed in block construction of two members: the housing part 41 and the housing part 43, it becomes easy to establish respective shapes of the second oil flow path 309, the third oil flow path 310 and the opening 303 and further, the arrangement of these elements is facilitated as much.

(3$^{rd}$. Embodiment)

Figure 25:
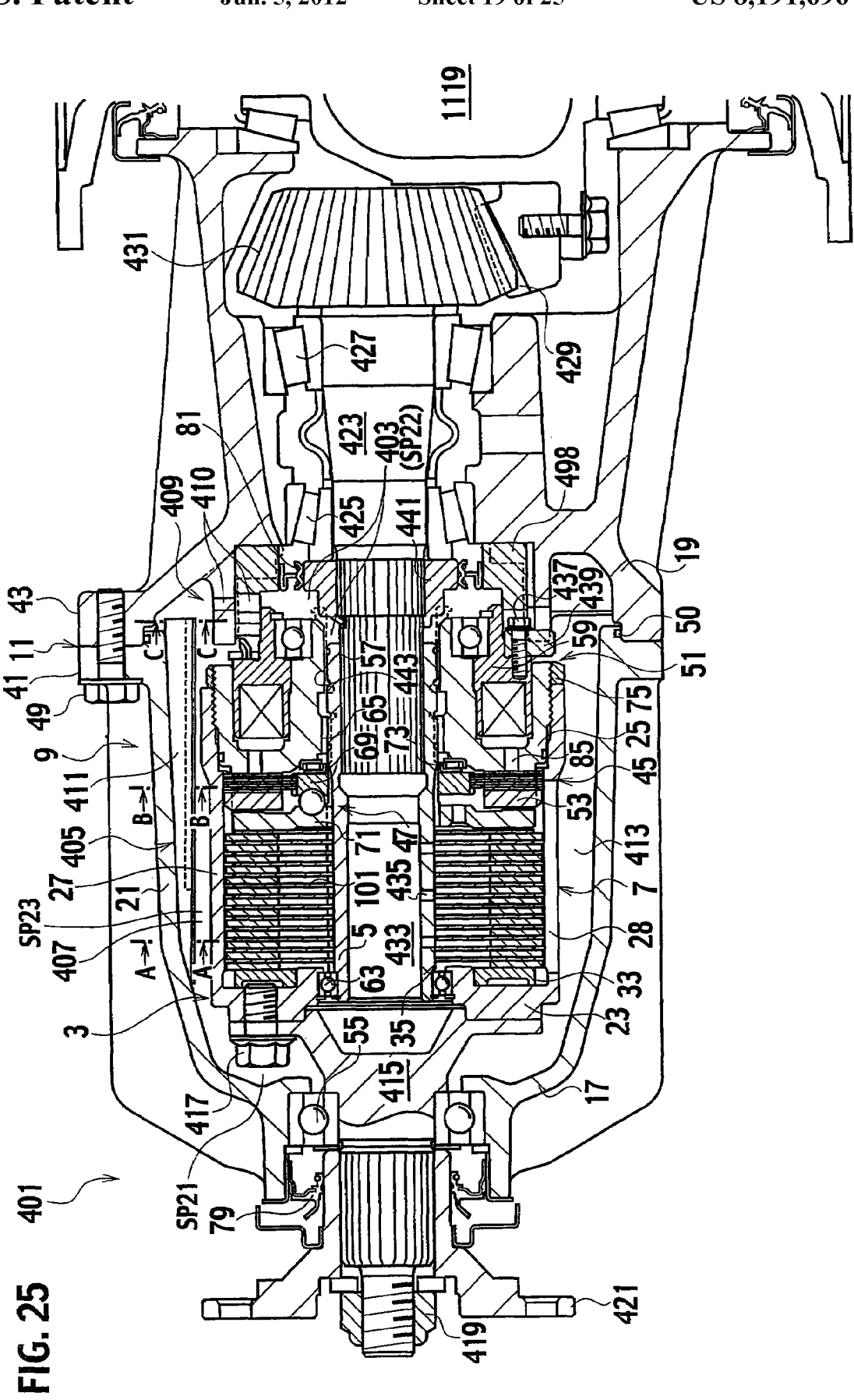
FIG. 25 is a sectional view of a torque transmission apparatus 401 in accordance with a third embodiment of the invention.
Figure 26:
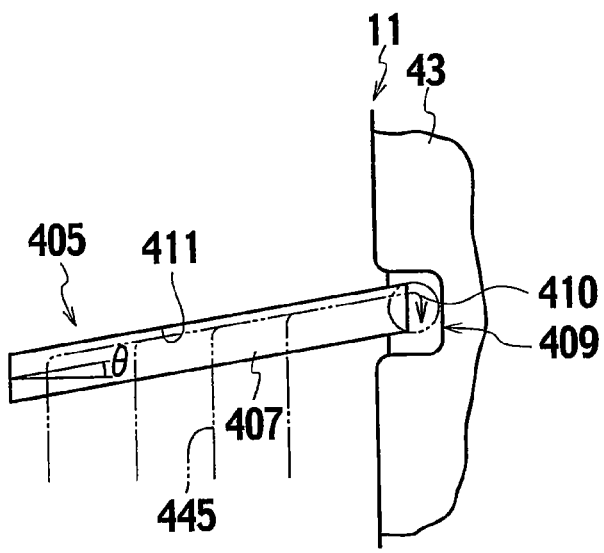
FIG. 26 is a view showing an inclination angle of a protrusion 405 of the torque transmission apparatus 401.
Figure 38:
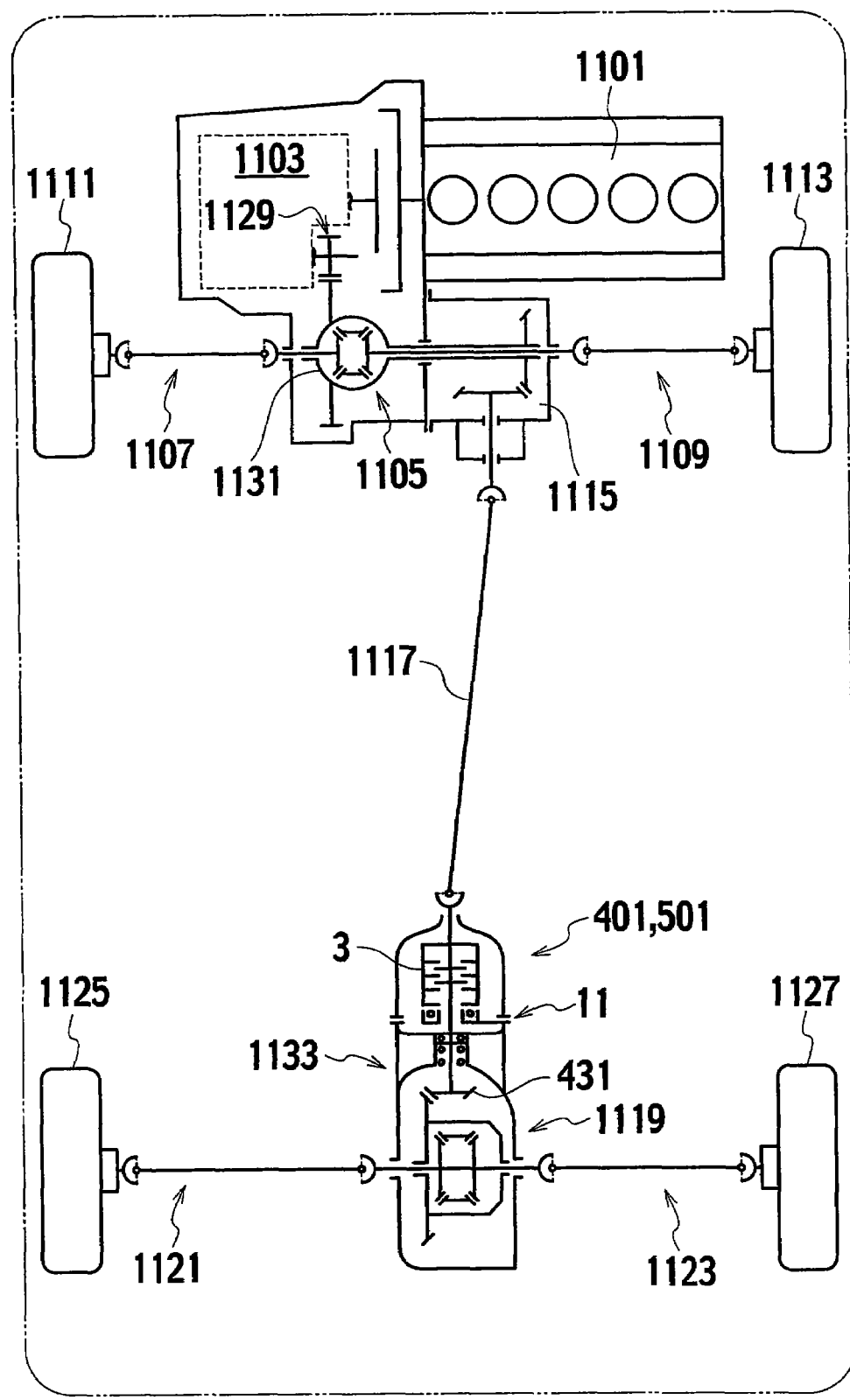
FIG. 38 is a skeleton structural view showing a power system of a four-wheel-drive vehicle equipped with the torque transmission apparatus 401 and the torque transmission apparatus 501.

Referring to FIGS. 25 to 32 and FIG. 38, a torque transmission apparatuses 401 will be described. FIG. 38 is a skeleton structural view showing a power system of a four wheel drive vehicle equipped with the torque transmission apparatus 401. In this figure, a left-and-right direction coincides with a left-and-right direction of this vehicle. In FIGS. 25 and 26, the left side in the figures corresponds to a front side of this vehicle.

[Constitution of Torque Transmission Apparatus 401]

The torque transmission apparatuses 401 includes the coupling 9 having the rotating casing 3 (the first torque transmission member), the hub 5 (the second torque transmission member) and the main clutch 7 (the frictional clutch) for transmitting a torque between the rotating casing 3 and the hub 5, the stationary hosing 11 accommodating the coupling 9, oil enclosed in the stationary housing 11 and an opening 403 formed in a part of the coupling 9 (in pattern A) so that the oil 13 in the stationary housing 11 is introduced into the coupling 9.

Again, the stationary housing 11 includes the first radial sidewall 17, the second radial sidewall 19 and the first circumferential wall 21 connecting the first and second sidewalls 17, 19 with each other. The rotating casing 3 includes the third radial sidewall 23, the fourth radial sidewall 25 and the second circumferential sidewall 27 connecting the third and fourth sidewalls 23, 25 with each other. The coupling 9 includes the electromagnet coil 51 (the actuator) for fastening the main clutch 7. The annular electromagnet coil 51 is arranged between the sidewalls 19 and 25 and also fixed to the sidewall 19 so as to be unable to rotate in relation to the sidewall 19. The first circumferential wall 21 is provided, on an upper part thereof in the vertical direction, with a protrusion 405 that extends in the direction of a rotating axis of the rotating casing 3 and also includes a left-end side (one end side) and a right-end side (the other end side) opened to outside. The protrusion 405 comprises a separate body from the stationary housing 11 (i.e. the circumferential wall 21) and is fixed on the inner circumference of the circumferential wall 21. The first circumferential wall 21 is formed so as to gradually increase its diameter from a left-end side of the rotating casing 3 in the axial direction to the right-end side. The oil 13 is enclosed in a spatial part 413 surrounded by the sidewalls 17, 23, the side walls 19, and the circumferential walls 21, 27, by a predetermined volume.

The spatial part 413 comprises a first spatial part SP21 defined by the first radial sidewall 17 and the third radial sidewall 23, a second spatial part SP22 (i.e. the opening 403) defined by the second radial sidewall 19 and the fourth sidewall 25 and a third spatial part SP23 defined by the first circumferential wall 21 and the second circumferential wall 27.

The third spatial part SP23, which has a coaxial and double-annular structure along the axial direction of the rotating casing 3, is adapted so that the first circumferential wall 21 and the second circumferential wall 27 form a predetermined narrow opposing gap G6 (not shown). By establishing this narrow opposing gap G6 as similar to the first and second embodiments, when the rotating casing 3 rotates, the oil 13 moves along an inner circumferential surface of the first circumferential wall 21 upward in the vertical direction in opposition to oil's own weight, effecting the rotational flowage of the oil as a whole. Then, the oil moves upward in the vertical direction along the inner circumferential surface of the first circumferential wall 21 while remaining a fluid power due to the rotation.

Again, the protrusion 405 has a structure (first oil flow path 407) opening in the rotating direction of the oil 13 and extending along the axial direction of the rotating casing. The protrusion 405 includes a side face 411 as an oil barrier to convert the fluid power of the oil 13, which rotationally flows between the circumferential walls 21 and 27 due to the rotation of the rotating casing, from the rotating direction to the axial direction, and a bottom face 408 for leading the oil 13, whose flowing direction has been converted from the rotating direction to the axial direction, to the right-end side. The side face 411 of the protrusion 405 converts the fluid power of the oil 13, which is rotationally flowing between the circumferential walls 21 and 27 due to the rotation of the rotating casing, from the rotating direction to the axial direction thereby to introduce the oil 13 into the opening 403. That is, the protrusion 405 not only functions as oil collecting means for collecting the oil 13 rotationally flowing between the circumferential walls 21 and 27 but acts as flowing-direction converting means for allowing the so-collected oil 13 to flow in the axial direction totally.

In detail, the protrusion 405 not only receives the oil 13 that is rotationally flowing between the circumferential walls 21 and 27 due to the rotation of the rotating casing 3 thereby to make the oil flowing from the front-end side to the right-end side but also releases the oil 13 from the rear-end side to an interval between the electromagnet coil 51 and the sidewall 19 thereby to introduce the oil 13 into the coupling 9 through the opening 403 formed between the inner circumferential side of the sidewall 25 and the outer circumference of the hub 5.

Then, by establishing a corresponding gap G7 (not shown) between the bottom face 408 of the protrusion 405 and the circumferential wall 27 so as to be remarkably narrower than the opposing gap G6 between the circumferential all 21 and the circumferential wall 27, it is possible to allow the oil 13 to hit against the side face 411 of the protrusion 405 more certainly.

Besides, the circumferential wall 27 is provided with openings 28 in the form of elongated holes, which are extend in the direction of the rotating axis so as to expose the main clutch 7, the ball cam 47, the armature 53 and the pilot clutch 45 to a spatial part 413. Through the openings, the oil 13 is capable of flowing inside and outside the circumferential wall 27.

In the torque transmission apparatus 401, a flow path for the oil 13 comprises the third spatial part SP23 allowing the flowing of the oil 13 in the rotating direction 447, the first oil flow path 307 provided in the third spatial part SP23 to convert the flowing direction of the oil 13 from the rotating direction to the axial direction, a second oil flow path 409 provided in the stationary housing 11 to allow the oil 13 flowing in the axial direction to flow toward the opening 403 radially inward and a third oil flow path 410 also provided in the stationary housing 11 (the housing part 43 and an adaptor 498) to allow the oil 13 flowing in the axial direction to flow toward the opening 403 radially inward. With the constitution, the oil 13 is introduced into the opening 403 while remaining the fluid power due to the rotational movement.

Figure 27:
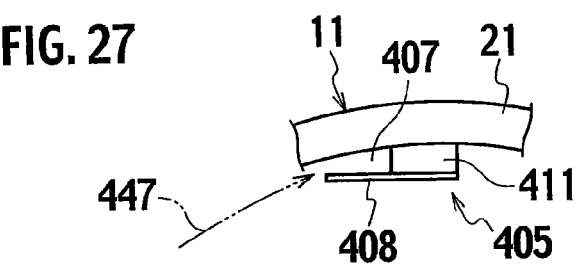
FIG. 27 is a partially-enlarged sectional view of the protrusion 405, showing its collecting of oil.
Figure 28:
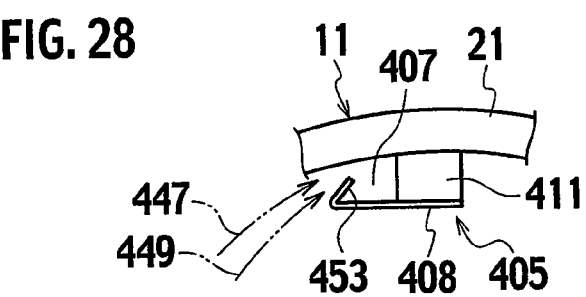
FIG. 28 is a partially-enlarged sectional view of the protrusion 405, showing its collecting of oil.
Figure 29:
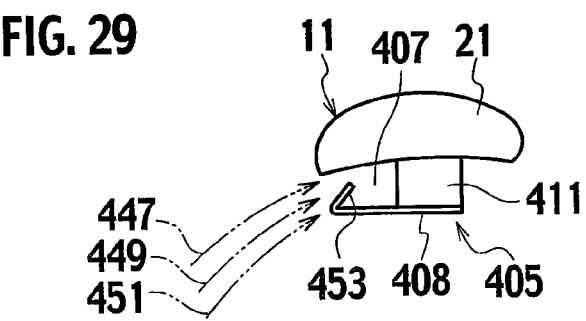
FIG. 29 is a partially-enlarged sectional view of the protrusion 405, showing its collecting of oil.

The side face 411 of the protrusion 405 is inclined from the axial direction of the rotating casing 3 to the rotating direction by an angle θ in view of converting the flowing direction of the oil 13 from the rotating direction to the axial direction (FIG. 26). Corresponding to the rotating casing 3 whose diameter is increased gradually for the rear-end side, therefore, the side face 411 of the protrusion 405 is formed so as to increase a radial depth gradually for the rear-end side, as shown in FIGS. 27 to 29 (views from arrows A, B and C of FIG. 25).

The spatial part 413 is compartmentalized in the axial direction by the seals 79, 81 and 83. In the spatial part 413, its one side containing the electromagnet coil 51 faces the opening 403.

By forming a second opening (the second oil flow path 409, the third oil flow path 410) in at least either the sidewall 19 or the electromagnet coil 51, the rear-end side of the protrusion 405 is communicated with the opening 403 (the second spatial part SP22).

The stationary housing 11 includes the first housing part 41 and the second housing part 43. On the inner circumferential side of the second circumferential wall 27, there are arranged: the main clutch 7 (the first frictional clutch) and the pilot clutch 45 (the second frictional clutch) as the frictional clutch; and the ball cam 47 (the cam mechanism) that converts a fastening force of the pilot clutch 45 to a cam thrust force (axial thrust) and also fastens the pilot clutch 45 by the cam thrust force.

[Constitution of Power System]

As shown in FIG. 38, the power system of the above four-wheel-drive vehicle comprises a transverse engine 1101 (motor), a transmission 1103, a front differential 1105, front axles 1107, 1109, front wheels 1111, 1113, a rear-wheel propeller shaft 1117, the torque transmission apparatus 401, a rear differential 1119, rear axles 1121, 1123, rear wheels 1125, 1127 and so on.

The driving force of the engine 1101 is transmitted: from the transmission 1103 to a reduction gear mechanism 1129; then from the reduction gear mechanism 1129 to the differential casing 1131; and then from the differential casing 1131 to the front differential 1105 and further distributed from the front axles 1107, 1109 to the front wheels 1111, 1113 and also from the differential casing 1131 to the torque transmission apparatus 401 through the transfer 1115 and the rear-wheel propeller shaft 1117. When the torque transmission apparatus 401 is in the connected state, the driving force is transmitted from the a reduction gear mechanism 1133 to the rear differential 1119 and subsequently distributed from the rear axles 1121, 1123 to the rear wheels 1125, 1127, accomplishing a four-wheel driving condition.

When the torque transmission apparatus 401 is released from the connected condition, the vehicle is brought into the two-wheel and front-driving condition.

In this way, the torque transmission apparatus 401 is used as a 2/4-wheel switching mechanism for connecting and disconnecting a vehicle's rear-wheel side in a four-wheel-drive vehicle on the basis of a front wheel driving.

[Constitution of Torque Transmission Apparatus 401]

In the stationary housing 11, the housing parts 41, 43 are fixed to each other by the bolts 49. In the torque transmission apparatus 401, the housing part 43 forms a front part of the differential carrier accommodating the rear differential 1119.

The coupling 9 accommodated in the stationary housing 11 comprises the electromagnet coil 51, the armature 53, the controller (not shown) etc. in addition to the rotating casing 3, the hub 5, the main clutch 7, the pilot clutch 45 and the ball cam 47.

A power transmitting shaft 415 is fixed to the front-end side of the rotating casing 3 by bolts 417. A flange 421 is spline-connected to the power transmitting shaft 415 and fixed thereto by a nut 419. This flange 421 is connected to the side of the propeller shaft 1117. The power transmitting shaft 415 is supported by the stationary housing 11 through the both side-seal type ball bearing 55. In the rotating casing 3, its rear end is supported by the stationary housing 11 through the both side-seal type ball bearing 57 and the core 59 of the electromagnet coil 51.

The hub 5 is formed by a hollow member whose front and rear ends are supported by the rotating casing 3 through the ball bearing 63 and the needle bearing 65, respectively. The inner circumference of the hub 5 is spline-connected to a drive pinion shaft 423. The drive pinion shaft 423 is supported by the housing part 43 through bearings 425, 425 receiving a thrust force of the shaft. The drive pinion shaft 423 is formed, at its rear end, integrally with a bevel gear 431 that meshes with a bevel gear 429 of the rear differential 1119 thereby to form the reduction gear mechanism 1133.

In the main clutch 7, the outer plate 33 is spline-connected to the inner circumference of the rotating casing 3, while the inner plates 35 are spline-connected to the outer circumference of the hub 5. Each of the inner plates 35 is provided with the oil holes 101 that promote the movement of the oil 13, especially, enhance lubrication effect between the plates 33 and 35. In the inner circumference of the hub 5, there are an oil reservoir 433 for reserving the oil and oil holes 435 communicating the oil reservoir 433 with the side of the plates 33, 35 for enhancing the lubrication effect.

The ball cam 47 is interposed between the cam ring 69 and the pressure plate 71. The cam ring 69 is supported on the outer circumference of the hub 5 so as to be rotatable relatively to it. The pressure plate 71 is spline-connected to the outer circumference of the hub 5 so as to be axially movable to it. The bearing 73 is arranged between the cam ring 69 and the sidewall 25 to receive a cam reaction force of the ball cam 47. The armature 53 is arranged between the pilot clutch 45 and the pressure plate 71 and also spline-connected to the inner circumference of the rotating casing 3 so as to be axially movable to it. The sidewall 25 is screw-engaged with the rear end of the circumferential wall 27 and axially positioned by the nut 75 functioning as a double-nut locking member. In the electromagnet coil 51, the core 59 is whirl-stopped to the housing part 43 of the stationary housing 11 by bolts 437 and a whirl-stop member 439.

The seal 79 is interposed between the front end of the stationary housing 11 (the housing part 41) and the flange 421 to prevent a leakage of the oil and an invasion of foreign matter. At the rear end of the stationary housing 11 (the front end of the housing part 43), a seal 81 is interposed between the housing 11 and a nut 441 applying a preload on the bearings 425, 427 of the drive pinion shaft 423 to prevent the oil on the side of the torque transmission apparatus 401 from being mixed with oil on the side of the rear differential 1119. The O-ring 85 is arranged between the circumferential wall 27 of the rotating casing 3 and the sidewall 25.

The controller carries out the operations of exciting the electromagnet coil 51, controlling an exciting current, stopping the excitation and so on. When the electromagnet coil 51 is excited by the controller, the armature 53 is attracted to cause the pilot clutch 45 to be fastened. Consequently, the ball cam 47 on receipt of torque operates to produce a cam thrust force. Due to the cam thrust force, the pressure plate 71 presses the main clutch 7 for its connection. When the excitation of the electromagnet coil 51 is stopped, the connection of the main clutch 7 is cancelled.

When the main clutch 7 (the torque transmission apparatus 401) is brought into its connected state, the driving force of the engine 1101 is transmitted to the rear differential 1119, so that the vehicle is brought into a four-wheel driving condition. While, if the connection at the main clutch is cancelled, then the vehicle is brought into a two-wheel driving condition.

Further, when the controller controls the exciting current while the main clutch 7 is being connected, the cam thrust force of the ball cam 47 changes due to slipping of pilot clutch 45 thereby to enable a controlling of the driving force to be transmitted to the rear differential 1119 through the main clutch 7. In this way, it is possible to adjust the distribution ratio of driving force between the front wheels and the rear wheel.

The sidewall 25 is provided, on its inner circumference, with a spiral groove 443 as an oil introducing part for leading the oil 13 from the opening 403.

It is noted that the spiral groove 443 may be formed by either a one-way spiral groove or an "intersecting" both-way (lattice type) spiral groove. Alternatively, as shown in FIG. 20 (showing the torque transmission apparatus 301 of the second embodiment), the sidewall may be formed with the slanted groove 323.

Corresponding to the rotating casing 3, during traveling of the vehicle, the oil 13 rotationally flows between the circumferential walls 21 and 27 (the spatial part 413) due to its viscosity and along the circumferential wall 21 upward in the vertical direction. Then, the oil 13 is collected by the side face 411 of the protrusion 405 fixed on the upper part of the wall in the vertical direction. Successively, as shown with arrow 445 of FIG. 26, the flowing direction of the oil 13 is converted from the rotating direction to the axial direction, so that the oil 13 flows in the first flow path 407 rearward, at the inclination angle θ. Further, from the right-end side of the housing, the oil 13 flows radially inward through the second flow path 409. Then, the oil 13 is forcibly introduced into the coupling 9 through the opening 403 while remaining the fluid power. In this way, the oil 13 lubricates and cools down the ball cam 47, the pilot clutch 45, the armature 53, the main clutch 7 (the plates 33, 35) and so on.

Additionally, it is noted that the side face 411 of the protrusion 405 is formed more deeply as approaching the rear side more closely. Therefore, as shown with arrows 447, 449 and 451 of FIGS. 27 to 29, the amount of collected oil is gradually increased as approaching the rear side. Further, the oil 13 rotationally flowing along the circumferential wall 21 of the stationary housing 11 enlarged in diameter on its rear side moves rearward thereby to allow the protrusion 405 to collect a large amount of oil 13. Still further, as shown in FIGS. 28 and 29, as an escape of the oil 13 is restrained by a turn-back part 453 of the protrusion 405, the amount of oil to be introduced through the opening 403 forcibly is increased as much, enhancing the lubrication and cooling effect.

Figure 30:
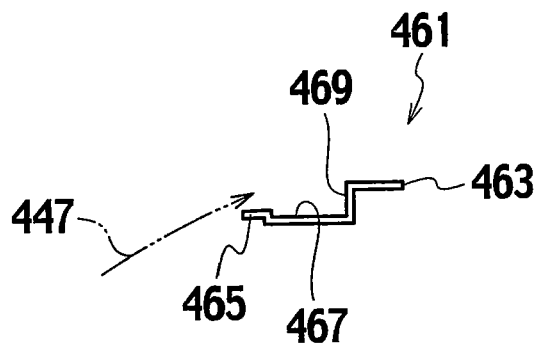
FIG. 30 is a partially-enlarged sectional view of a protrusion 461 of the torque transmission apparatus 401, showing the protrusion's collecting of oil.
Figure 31:
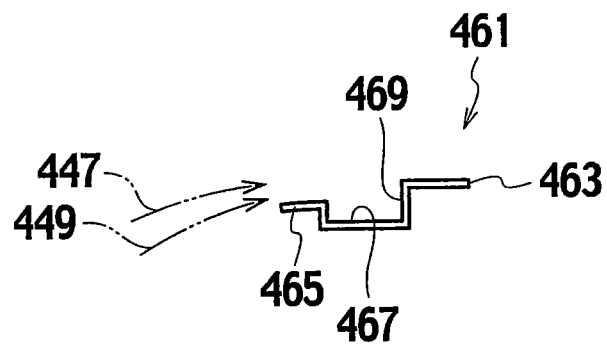
FIG. 31 is a partially-enlarged sectional view of the protrusion 461, showing its collecting of oil.
Figure 32:
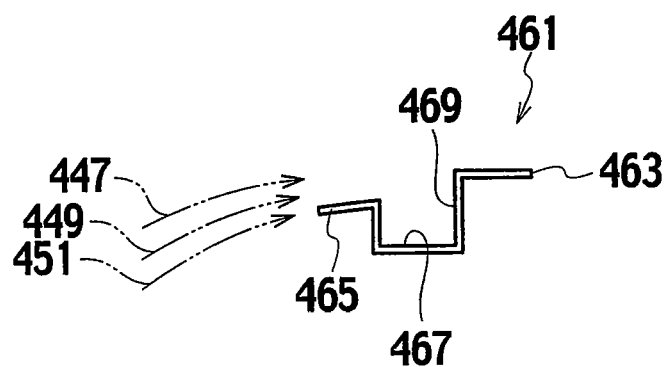
FIG. 32 is a partially-enlarged sectional view of the protrusion 461, showing its collecting of oil.

FIGS. 30 to 32 show another protrusion 461.

The protrusion 461 is attached to the circumferential wall 21 of the stationary housing 11 at an inclination angle θ and includes an attachment part 463 for the circumferential wall 21, an edge part 465 on the oil introductory side and a tray part (bottom part) 467 between the attachment part 463 and the edge part 465. The tray part 467 is provided with a side face 469 for receiving the oil in rotational flowage. Similarly to the protrusion 405, the side face 469 is formed more deeply as approaching the rear-end side more closely.

As shown with arrows 447, 449 and 451, the protrusion 461 has a similar oil-collecting function to the projection 401.

[Effects of Torque Transmission Apparatus 401]

With the above-mentioned constitutions, the torque transmission apparatus 401 has the following effects.

As the enclosed oil 13 is cooled down by its contact with the stationary housing 11, the torque transmission apparatus 401 has an improved cooling capability.

Additionally, as the so-cooled oil 13 is introduced into the coupling 9 through the opening 403, the reduction in transmitting torque is suppressed.

Again, as the oil 13 is difficult to be elevated in temperature, the deterioration of the oil 13 at high temperature is suppressed to improve the durability of the coupling 9.

Still further, as the oil 13 rotationally flows between the circumferential walls 21 and 27 (establishment of an interval between the walls 21 and 27 so as to allow the oil 13 to be accompanied with a relative rotation between the walls 21 and 27), it is possible to introduce the oil 13 into the opening 403 in comparison with an arrangement for simply stirring the oil 13, quickly and efficiently.

Again, by allowing the oil 13 to rotationally flow between the circumferential walls 21 and 27, the rotational flowage of the oil 13 can be attained in comparison with an arrangement for simply stirring the oil 13, rapidly and effectively. Further, owing to the provision of the protrusions 405, 461, it is possible to convert this rotational flowage to an axial flowage and also possible to introduce the oil into the opening 403 through the rear-end side.

In this way, there is established a circulation route of the oil 13 against the coupling 9 with the electromagnet coil 51 by: allowing the oil 13 to rotationally flow in the first flow path 407 thereby to attain rapid and effective rotational flowage in comparison with an arrangement for simply stirring the oil 13; converting this rotational flowage to the axial flowage by the protrusions 405, 461 and sequentially the radially-inward flowage by the second oil flow path 409; and releasing/introducing the oil 13 to the opening 403. Thus, it is possible to lubricate and cool down peripheral members including the electromagnet coil 51 certainly.

Additionally, as the rotating power produced in the oil 13 due to the rotational flowage between the circumferential walls 21 and 27 is remained as a fluid power until it is introduced into the opening 403, it is possible to improve the lubrication and cooling effect by introducing the oil 13 into the opening 403 through the fluid power forcibly.

Further, as the degree of freedom in embodiments of streaming the oil 13 from the protrusions 405, 461 toward the opening 403 is increased by arranging the protrusions 405, 461 on the upper part of the housing in the vertical direction, the restrictions in positioning the opening 403 are alleviated as much.

Further, as the circumferential wall 21 is formed so as to gradually increase its diameter from one side in the axial direction to the other side, it is possible to allow the oil 13 in rotational flowage to be moved to a direction to increase the diameter (i.e. rearward) due to a centrifugal force of the oil.

Again, as the protrusions 405, 461 are commonly inclined at the inclination angle θ, it is possible to convert the rotating power of the oil 13 in rotational flowage to an axial power and also possible to direct the axial power toward the opening 403 smoothly.

Again, as the protrusions 405, 461 are formed by different bodies from the stationary housing 11, the determination in the shape of the protrusions is facilitated to carry out the fabrication at a lower price as much.

Since the oil 13 is collected by the side faces 411, 469 of the protrusions 405, 461, it is possible to transfer the oil 13 toward the opening 403 certainly.

The oil 13 can be reserved in the spatial part 413 defined by the electromagnet coil 51, the stationary housing 11 and the seals 79, 81 and 83. As the third spatial part SP23 of the spatial part 413 faces the opening 403 (the second spatial part SP22), it is possible to make the oil 13 flow from the third spatial part SP23 to the opening 403 (the second spatial part SP22) easily.

Again, as the provision of the second opening (the second oil flow path 409, the third oil flow path 410) allows the formation of an oil passage for the opening 403, it is possible to attain a smooth flowage of the oil 13 toward the opening 403 by cogitating both the second oil flow path 409 and the third oil flow path 410 in terms of their configurations.

Additionally, since the stationary housing 11 is formed in block construction of two members: the housing part 41 and the housing part 43, it becomes easy to establish respective shapes of the second oil flow path 409, the third oil flow path 410 and the opening 403 and further, the arrangement of arrange these elements is facilitated as much.

(4$^{th}$. Embodiment)

Figure 33:
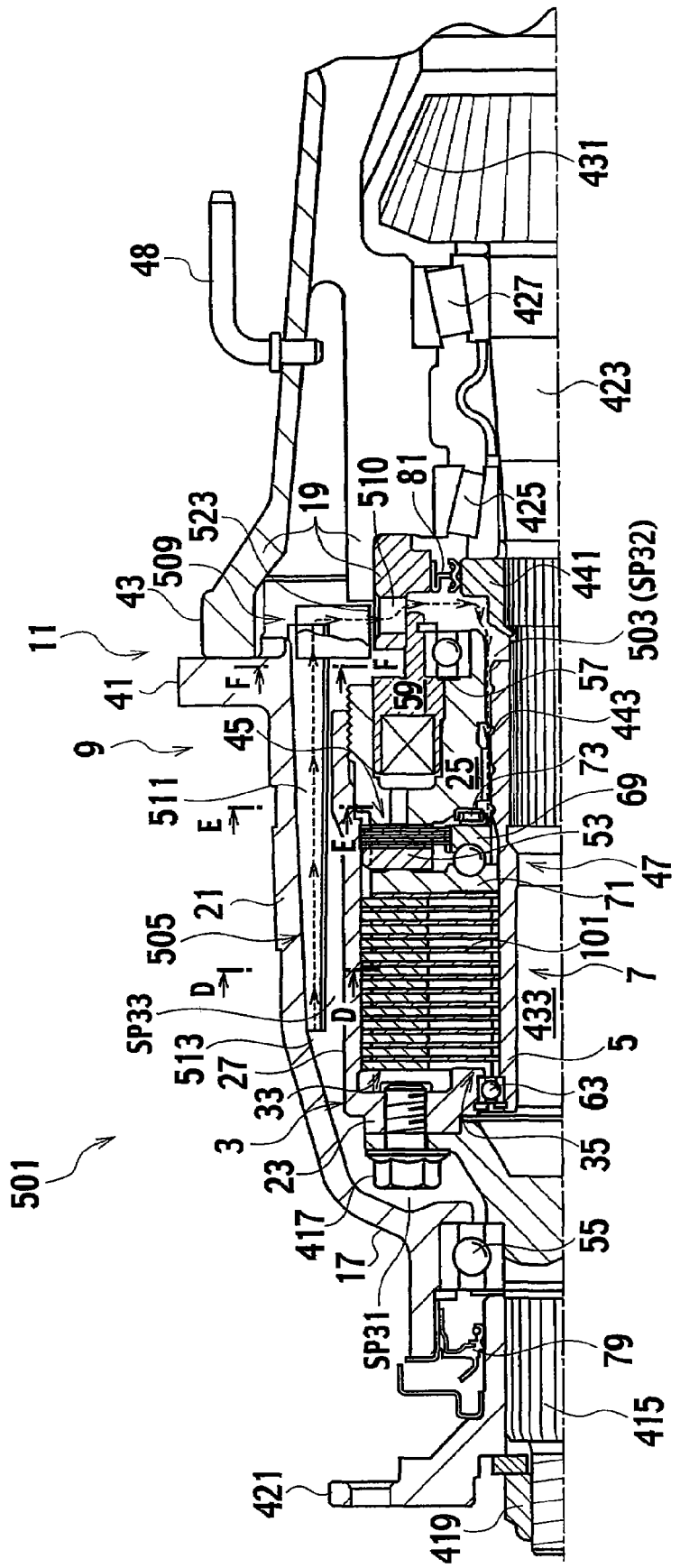
FIG. 33 is a sectional view of a torque transmission apparatus 501 in accordance with a fourth embodiment of the invention.

Referring to FIGS. 33 to 37 and FIG. 38, a torque transmission apparatuses 501 will be described. FIG. 38 is a skeleton structural view showing a power system of a four wheel drive vehicle equipped with the torque transmission apparatus 501. In this figure, a left-and-right direction coincides with a left-and-right direction of this vehicle. In FIG. 33, the left side corresponds to a front side of this vehicle.

[Constitution of Torque Transmission Apparatus 501]

The torque transmission apparatuses 501 includes the coupling 9 having the rotating casing 3 (the first torque transmission member), the hub 5 (the second torque transmission member) and the main clutch 7 (the frictional clutch) for transmitting a torque between the rotating casing 3 and the hub 5, the stationary hosing 11 accommodating the coupling 9, oil enclosed in the stationary housing 11 and an opening 503 formed in a part of the coupling 9 (in pattern A) so that the oil 13 in the stationary housing 11 is introduced into the coupling 9.

Again, the stationary housing 11 includes the first radial sidewall 17, the second radial sidewall 19 and the first circumferential wall 21 connecting the first and second sidewalls 17, 19 with each other. The rotating casing 3 includes the third radial sidewall 23, the fourth radial sidewall 25 and the second circumferential sidewall 27 connecting the third and fourth sidewalls 23, 25 with each other. The coupling 9 includes the electromagnet coil 51 (the actuator) for fastening the main clutch 7. The annular electromagnet coil 51 is arranged between the sidewalls 19 and 25 and also fixed to the sidewall 19 so as to be unable to rotate in relation to the sidewall 19. In a position (FIG. 34) preceding an uppermost part of the circumferential wall 21 in the vertical direction by a predetermined angle θ2 (ex. 15°), a protrusion 405 is formed so as to extend in the direction of the rotating axis of the rotating casing 3. Further, the protrusion 505 includes a left-end side (one-end side) and a right-end side (the other-end side) opened to outside. The protrusion 505 comprises a separate body from the stationary housing 11 (i.e. the circumferential wall 21) and is fixed on the inner circumference of the circumferential wall 21. The first circumferential wall 21 is formed so as to gradually increase its diameter from a front-end side (one side) of the rotating casing 3 in the axial direction to the rear-end side (the other side).

The oil 13 is enclosed in a spatial part 513 surrounded by the sidewalls 17, 23, the side walls 19, 25 and the circumferential walls 21, 27, by a predetermined volume.

The spatial part 513 comprises a first spatial part SP31 defined by the first radial sidewall 17 and the third radial sidewall 23, a second spatial part SP32 (i.e. the opening 503) defined by the second radial sidewall 19 and the fourth sidewall 25 and a third spatial part SP33 defined by the first circumferential wall 21 and the second circumferential wall 27.

The third spatial part SP33, which has a coaxial and double-annular structure along the axial direction of the rotating casing 3, is adapted so that the first circumferential wall 21 and the second circumferential wall 27 form a predetermined narrow opposing gap G8 (not shown). By establishing this narrow opposing gap G8 as similar to the first, second and third embodiments, when the rotating casing 3 rotates, the oil 13 moves along an inner circumferential surface of the first circumferential wall 21 upward in the vertical direction in opposition to oil's own weight, effecting the rotational flowage of the oil as a whole. Then, the oil moves upward in the vertical direction along the inner circumferential surface of the first circumferential wall 21 while remaining a fluid power due to the rotation.

The protrusion 505 has a structure (first oil flow path 507) opening in the rotating direction of the oil 13 and extending along the axial direction of the rotating casing. Again, the protrusion 505 includes a side face 511 as an oil barrier to convert the fluid power of the oil 13, which rotationally flows between the circumferential walls 21 and 27 due to the rotation of the rotating casing, from the rotating direction to the axial direction, and a bottom face 508 for leading the oil 13, whose flowing direction has been converted from the rotating direction to the axial direction, to the right-end side. The side face 511 of the protrusion 505 converts the fluid power of the oil 13, which is rotationally flowing between the circumferential walls 21 and 27 due to the rotation of the rotating casing, from the rotating direction to the axial direction thereby to introduce the oil 13 into the opening 503. That is, the protrusion 505 not only functions as oil collecting means for collecting the oil 13 rotationally flowing between the circumferential walls 21 and 27 but acts as flowing-direction converting means for allowing the so-collected oil 13 to flow in the axial direction totally.

In detail, the protrusion 505 not only receives the oil 13 that is rotationally flowing between the circumferential walls 21 and 27 due to the rotation of the rotating casing 3 thereby to make the oil flowing from the front-end side to the right-end side but also releases the oil 13 from the rear-end side to an interval between the electromagnet coil 51 and the sidewall 19 thereby to introduce the oil 13 into the coupling 9 through the opening 403 formed between the inner circumferential side of the sidewall 25 and the outer circumference of the hub 5.

Then, by establishing a corresponding gap G9 (not shown) between the bottom face 508 of the protrusion 505 and the circumferential wall 27 so as to be remarkably narrower than the opposing gap G6 between the circumferential all 21 and the circumferential wall 27, it is possible to allow the oil 13 to hit against the side face 511 of the protrusion 505 more certainly.

In the torque transmission apparatus 501, a flow path for the oil 13 comprises the third spatial part SP33 allowing the flowing of the oil 13 in the rotating direction 519, the first oil flow path 507 provided in the third spatial part SP33 to convert the flowing direction of the oil 13 from the rotating direction to the axial direction, a second oil flow path 509 provided in the stationary housing 11 to allow the oil 13 flowing in the axial direction to flow toward the opening 503 radially inward and a third oil flow path 510 also provided in the stationary housing 11 (the housing part 43) to allow the oil 13 flowing in the axial direction to flow toward the opening 503 radially inward.

With the constitution, the oil 13 is introduced into the opening 503 while remaining the fluid power due to the rotational movement.

Figure 35:
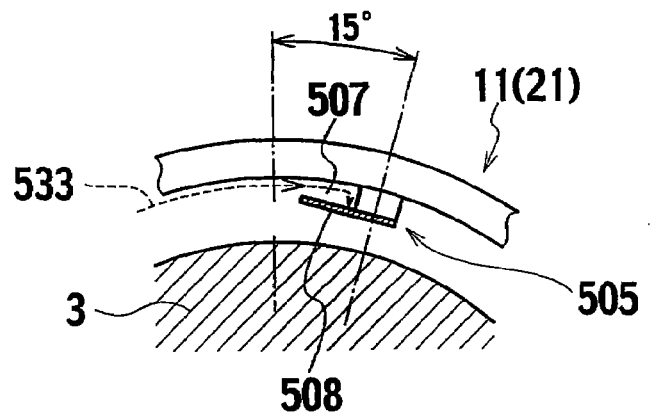
FIG. 35 is a partially-enlarged sectional view of a protrusion 405 of the torque transmission apparatus 501, showing the protrusion's collecting of oil.
Figure 36:
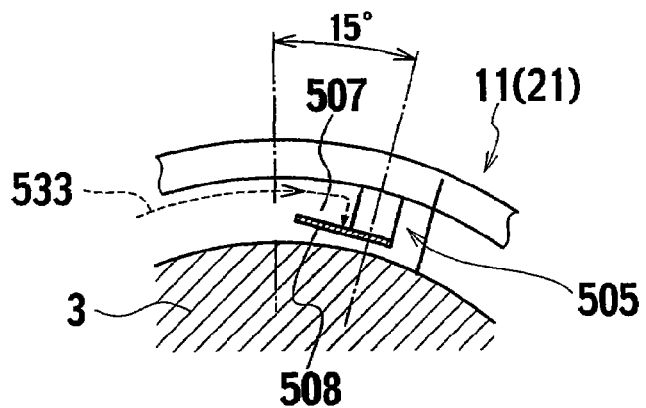
FIG. 36 is a partially-enlarged sectional view of the protrusion 505, showing its collecting of oil.
Figure 37:
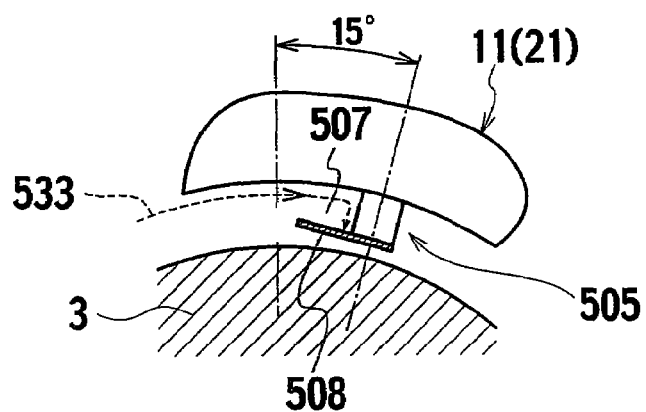
FIG. 37 is a partially-enlarged sectional view of the protrusion 505, showing its collecting of oil.

The side face 511 of the protrusion 505 is inclined from the axial direction of the rotating casing 3 to the rotating direction by an angle θ in view of converting the flowing direction of the oil 13 from the rotating direction to the axial direction. Corresponding to the rotating casing 3 whose diameter is gradually increased toward the rear-end side, therefore, the side face 511 of the protrusion 505 is formed so as to increase a radial depth gradually for the rear-end side, as shown in FIGS. 35 to 37 (views from arrows D, E and F of FIG. 33).

The spatial part 513 is compartmentalized in the axial direction by the seals 79, 81 and 83. In the spatial part 513, its one side containing the electromagnet coil 51 faces the opening 503.

By forming a second opening (the second oil flow path 509, the third oil flow path 510) in at least either the sidewall 19 or the electromagnet coil 51, the rear-end side of the protrusion 505 is communicated with the opening 503 (the second spatial part SP32).

The stationary housing 11 includes the first housing part 41 and the second housing part 43. On the inner circumferential side of the second circumferential wall 27, there are arranged: the main clutch 7 (the first frictional clutch) and the pilot clutch 45 (the second frictional clutch) as the frictional clutch; and the ball cam 47 (the cam mechanism) that converts a fastening force of the pilot clutch 45 to a cam thrust force (axial thrust) and also fastens the pilot clutch 45 by the cam thrust force.

[Constitution of Power System]

As shown in FIG. 38, the power system of the above four-wheel-drive vehicle comprises the transverse engine 1101 (the motor), the transmission 1103, the front differential 1105, the front axles 1107, 1109, the front wheels 1111, 1113, the rear-wheel propeller shaft 1117, the torque transmission apparatus 501, the rear differential 1119, the rear axles 1121, 1123, the rear wheels 1125, 1127 and so on.

The driving force of the engine 1101 is transmitted: from the transmission 1103 to the reduction gear mechanism 1129; then from the reduction gear mechanism 1129 to the differential casing 1131; and then from the differential casing 1131 to the front differential 1105 and further distributed from the front axles 1107, 1109 to the front wheels 1111, 1113 and also from the differential casing 1131 to the torque transmission apparatus 501 through the transfer 1115 and the rear-wheel propeller shaft 1117. When the torque transmission apparatus 501 is in the connected state, the driving force is transmitted from the a reduction gear mechanism 1133 to the rear differential 1119 and subsequently distributed from the rear axles 1121, 1123 to the rear wheels 1125, 1127, accomplishing a four-wheel driving condition.

When the torque transmission apparatus 501 is released from the connected condition, the vehicle is brought into the two-wheel and front-driving condition.

In this way, the torque transmission apparatus 501 is used as a 2/4-wheel switching mechanism for connecting and disconnecting a vehicle's rear-wheel side in a four-wheel-drive vehicle on the basis of a front wheel driving.

[Constitution of Torque Transmission Apparatus 501]

In the stationary housing 11, the housing parts 41, 43 are fixed to each other by the bolts 49. In the torque transmission apparatus 501, the housing part 43 forms a front part of the differential carrier accommodating the rear differential 1119.

The coupling 9 accommodated in the stationary housing 11 comprises the electromagnet coil 51, the armature 53, the controller (not shown) etc. in addition to the rotating casing 3, the hub 5, the main clutch 7, the pilot clutch 45 and the ball cam 47.

The power transmitting shaft 415 is fixed to the front-end side of the rotating casing 3 by bolts 417. The flange 421 is spline-connected to the power transmitting shaft 415 and fixed thereto by a nut 419. This flange 421 is connected to the side of the propeller shaft 1117. The power transmitting shaft 415 is supported by the stationary housing 11 through the both side-seal type ball bearing 55. In the rotating casing 3, its rear end is supported by the stationary housing 11 through the both side-seal type ball bearing 57 and the core 59 of the electromagnet coil 51.

The hub 5 is formed by a hollow member whose front and rear ends are supported by the rotating casing 3 through the ball bearing 63 and the needle bearing 65, respectively. The inner circumference of the hub 5 is spline-connected to the drive pinion shaft 423. The drive pinion shaft 423 is supported by the housing part 43 through bearings 425, 425 receiving a thrust force of the shaft. The drive pinion shaft 423 is formed, at its rear end, integrally with the bevel gear 431 that meshes with the bevel gear 429 of the rear differential 1119 thereby to form the reduction gear mechanism 1133.

In the main clutch 7, the outer plate 33 is spline-connected to the inner circumference of the rotating casing 3, while the inner plates 35 are spline-connected to the outer circumference of the hub 5. Each of the inner plates 35 is provided with the oil holes 101 that promote the movement of the oil 13, especially, enhance lubrication effect between the plates 33 and 35. The hub 5 is provided, in its inner circumference, with the oil reservoir 433 for reserving the oil and the oil holes 435 that communicate the oil reservoir 433 with the side of the plates 33, 35 thereby to enhance the lubrication effect.

The ball cam 47 is interposed between the cam ring 69 and the pressure plate 71. The cam ring 69 is supported on the outer circumference of the hub 5 so as to be rotatable relatively to it. The pressure plate 71 is spline-connected to the outer circumference of the hub 5 so as to be axially movable to it. The bearing 73 is arranged between the cam ring 69 and the sidewall 25 to receive a cam reaction force of the ball cam 47. The armature 53 is arranged between the pilot clutch 45 and the pressure plate 71 and also spline-connected to the inner circumference of the rotating casing 3 so as to be axially movable to it. The sidewall 25 is screw-engaged with the left end of the circumferential wall 27 and axially positioned by the nut 75 functioning as a double-nut locking member. In the electromagnet coil 51, the core 59 is whirl-stopped to the housing part 43 of the stationary housing 11 by the bolts 437 and the whirl-stop member 439.

The seal 79 is interposed between the front end of the stationary housing 11 (the housing part 41) and the flange 421 to prevent a leakage of the oil and an invasion of foreign matter. At the rear end of the stationary housing 11 (the front end of the housing part 43), the seal 81 is interposed between the housing 11 and the nut 441 applying a preload on the bearings 425, 427 of the drive pinion shaft 423 to prevent the oil on the side of the torque transmission apparatus 501 from being mixed with oil on the side of the rear differential 1119. The O-ring 85 is arranged between the circumferential wall 27 of the rotating casing 3 and the sidewall 25.

The controller carries out the operations of exciting the electromagnet coil 51, controlling an exciting current, stopping the excitation and so on. When the electromagnet coil 51 is excited by the controller, the armature 53 is attracted to cause the pilot clutch 45 to be fastened. Consequently, the ball cam 47 on receipt of torque operates to produce a cam thrust force. Due to the cam thrust force, the pressure plate 71 presses the main clutch 7 for its connection. When the excitation of the electromagnet coil 51 is stopped, the connection of the main clutch 7 is cancelled.

When the main clutch 8 (the torque transmission apparatus 501) is brought into its connected state, the driving force of the engine 1101 is transmitted to the rear differential 1119, so that the vehicle is brought into a four-wheel driving condition. While, if the connection at the main clutch is cancelled, then the vehicle is brought into a two-wheel driving condition.

Further, when the controller controls the exciting current while the main clutch 7 is being connected, the cam thrust force of the ball cam 47 changes due to slipping of pilot clutch 45 thereby to enable a controlling of the driving force which is transmitted to the rear differential 1119 through the main clutch 7. In this way, it is possible to adjust the distribution ratio of driving force between the front wheels and the rear wheel.

The sidewall 25 is provided, on its inner circumference, with the spiral groove 443 as the oil introducing part for leading the oil 13 from the opening 503.

It is noted that the spiral groove 443 may be formed by either a one-way spiral groove or an "intersecting" both-way (lattice type) spiral groove. Alternatively, as shown in FIG. 20 (showing the torque transmission apparatus 301 of the second embodiment), the sidewall may be formed with the slanted groove 323.

An oil collector 523 is attached to the rear-end side of the protrusion 505 by bolts 515. The oil collector 523 is adapted to capture the oil 13 from the protrusion 505 and further make the oil 13 flow radially downward. The oil collector 523 forms a part of the second oil flow path 509.

Figure 34:
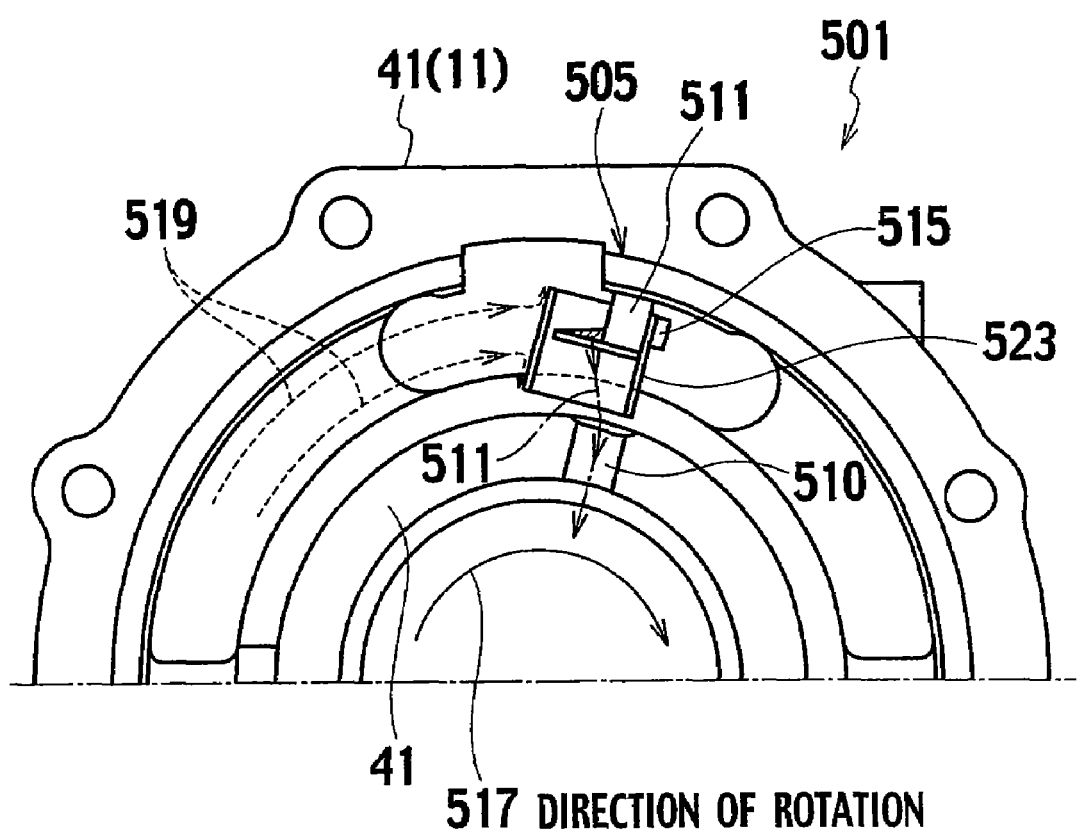
FIG. 34 is a longitudinal sectional view of the torque transmission apparatus 501, showing a substantial part thereof.

During traveling of the vehicle, the rotating casing 3 rotates in the direction of arrow 517 of FIG. 34. Corresponding to the rotation of the casing, the oil 13 rotationally flows between the circumferential walls 21 and 27 (the spatial part 513) due to its viscosity and along the circumferential wall 21 vertically upward (the direction of arrow 519). Then, the oil 13 is collected by the side face 511 of the protrusion 505. Successively, the flowing direction of the oil 13 is converted from the rotating direction to the axial direction, so that the oil 13 flows in the first flow path 507 rearward, at the inclination angle θ. As shown with arrow 521 of FIG. 34, from the rear-end side of the housing, the oil 13 flows through the oil collector 523, the second flow path 509 and the third oil flow path 510 of the housing part 43 and successively, the oil 13 flows inward in the radial direction. Then, the oil 13 is forcibly introduced into the coupling 9 through the opening 403 while remaining the fluid power. In this way, the oil 13 lubricates and cools down the ball cam 47, the pilot clutch 45, the armature 53, the main clutch 7 (the plates 33, 35) and so on.

Additionally, it is noted that the side face 511 of the protrusion 505 is formed more deeply as approaching the rear side more closely. Thus, as shown with arrow 533 of FIGS. 35 to 37, the amount of collected oil is gradually increased as approaching the rear side. Further, the oil 13 rotationally flowing along the circumferential wall 21 of the stationary housing 11 enlarged in diameter on its rear side moves rearward thereby to allow the protrusion 505 to collect a large amount of oil 13. Therefore, since the amount of oil to be introduced through the opening 503 forcibly is increased as much, it is possible to enhance the lubrication and cooling effect.

[Effects of Torque Transmission Apparatus 501]

With the above-mentioned constitutions, the torque transmission apparatus 501 has the following effects.

As the enclosed oil 13 is cooled down by its contact with the stationary housing 11, the torque transmission apparatus 501 has an improved cooling capability.

Additionally, as the so-cooled oil 13 is introduced into the coupling 9 through the opening 503, the reduction in transmitting torque is suppressed.

Again, as the oil 13 is difficult to be elevated in temperature, the deterioration of the oil 13 at high temperature is suppressed to improve the durability of the coupling 9.

Still further, as the oil 13 rotationally flows between the circumferential walls 21 and 27 (establishment of an interval between the walls 21 and 27 so as to allow the oil 13 to be accompanied with a relative rotation between the walls 21 and 27), it is possible to introduce the oil 13 into the opening 503 in comparison with an arrangement for simply stirring the oil 13, quickly and efficiently.

Again, by allowing the oil 13 to rotationally flow between the circumferential walls 21 and 27, the rotational flowage of the oil 13 can be attained in comparison with an arrangement for simply stirring the oil 13, rapidly and effectively. Further, owing to the provision of the protrusion 505, it is possible to convert this rotational flowage to an axial flowage and also possible to introduce the oil into the opening 503 through the rear-end side.

In this way, there is established a circulation route of the oil 13 against the coupling 9 equipped with the electromagnet coil 51 by: allowing the oil 13 to rotationally flow in the first flow path 507 thereby to attain rapid and effective rotational flowage in comparison with an arrangement for simply stirring the oil 13; converting this rotational flowage to the axial flowage by the protrusion 505 and the sequent radially-inward flowage by the second oil flow path 409; and releasing/introducing the oil 13 to the opening 503. Therefore, it is possible to lubricate and cool down peripheral members including the electromagnet coil 51 certainly.

Additionally, as the rotating power produced in the oil 13 due to the rotational flowage between the circumferential walls 21 and 27 is remained as a fluid power until it is introduced into the opening 503, it is possible to improve the lubrication and cooling effect by introducing the oil 13 into the opening 503 through the fluid power forcibly.

Further, as the degree of freedom in embodiments of streaming the oil 13 from the protrusion 505 toward the opening 503 is increased by arranging the protrusion 505 on the upper part of the housing in the vertical direction, the restrictions in positioning the opening 403 are alleviated as much.

Further, as the circumferential wall 21 is formed so as to gradually increase its diameter from one side in the axial direction to the other side, it is possible to allow the oil 13 in rotational flowage to be moved to a direction to increase the diameter (i.e. rearward) due to a centrifugal force of the oil.

Again, as the protrusion 505 is inclined at the inclination angle θ, it is possible to convert the rotating power of the oil 13 in rotational flowage to an axial power and also possible to direct the axial power toward the opening 503 smoothly.

Again, as the protrusion 505 is formed by a different body from the stationary housing 11, the determination in the shape of the protrusions is facilitated to carry out the fabrication at a lower price as much.

Since the oil 13 is collected by the side face 411 of the protrusion 505, it is possible to transfer the oil 13 toward the opening 503 certainly.

The oil 13 can be reserved in the spatial part 513 defined by the electromagnet coil 51, the stationary housing 11 and the seals 79, 81 and 83. As the third spatial part SP33 of the spatial part 513 faces the opening 503 (the second spatial part SP22), it is possible to make the oil 13 flow from the third spatial part SP33 to the opening 503 (the second spatial part SP22) easily.

Again, as the provision of the second opening (the second oil flow path 409, the third oil flow path 510) allows the formation of an oil passage for the opening 503, it is possible, to attain a smooth flowage of the oil 13 toward the opening 403 by cogitating both the second oil flow path 509 and the third oil flow path 510 in terms of their configurations.

Additionally, since the stationary housing 11 is formed in block construction of two members: the housing part 41 and the housing part 43, it becomes easy to establish respective shapes of the second oil flow path 509, the third oil flow path 510 and the opening 503 and further, the arrangement of arrange these elements is facilitated as much.

[Other Embodiments within Scope of Invention]

Without being limited only to the electromagnet coil, the actuator may be embodied in various forms, for instance, one using a hydraulic cylinder and a piston in pairs, one using an electric motor and a cam, etc.

Also, the frictional clutch may be provided in various forms, for instance, one using a corn ring, one using rollers and a sprag.

As mentioned above, the torque transmission apparatus of the present invention has an improved cooling capability in that the enclosed oil is cooled down by the stationary housing in contact therewith.

Additionally, as the so-cooled oil is introduced into the coupling through the opening, the reduction in transmitting torque is suppressed.

Again, as the oil is difficult to be elevated in temperature, the deterioration of the oil at high temperature is suppressed, so that the durability of the coupling can be improved.

As the torque transmission apparatus of the present invention is constructed so as to allow the oil to flow between the first circumferential wall and the second circumferential wall rotationally, it is possible to introduce the oil into the opening in comparison with an arrangement for simply stirring the oil, quickly and efficiently.

Additionally, by making the oil flow upward in the vertical direction, it is possible to supply the opening in a required position with the oil flowing from the upside of the opening.

The torque transmission apparatus of the present invention can establish a circulation route of oil against the coupling equipped with the actuator, allowing peripheral members including the actuator to be lubricated and cooled down certainly.

Again, by allowing the oil to flow between the first circumferential wall and the second circumferential wall rotationally, the rapid and effective rotational flowage of the oil can be attained in comparison with an arrangement for simply stirring the oil. Further, owing to the provision of the protrusion, it is possible to convert this rotational flowage to an axial flowage and also possible to introduce the oil into the opening through the other-end side.

The torque transmission apparatus of the present invention can establish a circulation route of oil against the coupling, allowing it to be lubricated and cooled down certainly.

By allowing the oil to rotationally flow in the first flow path, it is possible to attain the rapid and effective rotational flowage of the oil in comparison with an arrangement for simply stirring the oil. Further, it is possible to convert this rotational flowage to the axial flowage by providing the converting means (For instance, the means is provided in either the stationary housing or the first torque transmission member.) and also possible to introduce the oil to the opening by allowing the axial flowage of the oil to flow radially inward through the second oil flow path.

According to the torque transmission apparatus, as the rotating power produced in the oil due to its rotational flowage between the first circumferential wall and the second circumferential wall is remained as a fluid power until it is introduced into the opening, it is possible to allow the oil to be forcibly introduced into the opening by the fluid power.

The torque transmission apparatus of the present invention can convert the flowage of the oil from its rotating direction to a direction toward the opening since the opposing gap is established to be narrow.

According to the torque transmission apparatus of the present invention, since the side face of the protrusion (surface opposed in the circumferential direction) hits against the oil thereby to convert the rotational flowage to the radial direction, it is possible to direct the oil to the opening opposed in the radial direction, allowing the oil to be introduced effectively.

According to the torque transmission apparatus of the present invention, as the arrangement where the protrusion is arranged on the upside in the vertical direction causes an increase in the degree of freedom in streaming the oil from the protrusion toward the opening, the restrictions in positioning the opening are alleviated as much.

According to the torque transmission apparatus of the present invention, it is possible to allow the oil, whose flowing direction has been converted by the protrusion, to flow in the opening directly.

According to the torque transmission apparatus of the present invention, it is possible to lubricate and cool down a plurality of fastening members (clutch plates etc.) exposed through the opening since the same members are directly supplied with oil.

According to the torque transmission apparatus of the present invention, it is possible to supply respective fastening member with oil directly, allowing them to be lubricated and cooled down effectively.

According to the torque transmission apparatus of the present invention, even if the flowage of the oil is restricted by the end face of the protrusion, there is no possibility of exerting an influence on the flowage of the oil against the opening since the width of the opening in the rotating direction is broader than the width of the end face in the rotating direction.

According to the torque transmission apparatus of the present invention, since the first circumferential wall is enlarged in diameter in the axial direction, it is possible to allow the oil in rotational flowage to be moved to a direction to increase the diameter (axial direction) due to a centrifugal force of the oil.

According to the torque transmission apparatus of the present invention, owing to the provision of the large diameter part, it is possible to direct the oil to the opening with a restriction to the axial flowing of the oil.

According to the torque transmission apparatus of the present invention, as the protrusion is formed at a slant, it is possible to convert the fluid power of oil in rotational flowage to an axial power thereby to direct the oil to the opening smoothly.

In the torque transmission apparatus of the present invention, the protrusion(s) in the form of a different member from the housing is easy to be established in configuration.

According to the torque transmission apparatus of the present invention, since the oil is collected by a collecting wall part in the protrusion, it is possible to transfer the oil against the opening certainly.

According to the torque transmission apparatus of the present invention, the annular space defined by the actuator, the stationary housing and the seals can reserve oil and further, the annular space faces the opening. Thus, it is possible to make the oil flow from the annular space to the opening easily.

According to the torque transmission apparatus of the present invention, as the provision of the second opening allows the formation of an oil passage for the annular space, it is possible to suppress a leakage of oil through the annular space by cogitating the configuration of the opening, allowing the oil to flow against the first opening smoothly.

According to the torque transmission apparatus of the present invention, since the stationary housing is formed in block construction, it becomes easy to establish respective shapes of the oil flow path and the opening and further, the arrangement of these elements is facilitated as much.

According to the torque transmission apparatus of the present invention, since two or more functional parts are exposed through the opening, it is possible to lubricate and cool down the apparatus extensively as much.

Note, the expression "upside (upper part) in the vertical direction" in the descriptions of the embodiments means that, in both sections of the stationary housing and the coupling in the radial direction, a relevant element is positioned upside an intermediate portion of the coupling in the vertical direction, the intermediate portion having a maximum width in the rotating casing. The "upper part in the vertical direction" is not necessarily identical to an uppermost part in the vertical direction so long as the upper part is arranged in a position where high oil-introducing effect could be expected.

The invention claimed is:

1. A torque transmission apparatus comprising:
a coupling having first and second torque transmission members and a frictional clutch for transmitting a torque between the first torque transmission member and the second torque transmission member; and
a stationary housing accommodating the coupling,
wherein the coupling includes a first opening for introducing oil enclosed in the stationary housing into the coupling,
the stationary housing includes first and second radial sidewalls and a first circumferential wall connecting the first and second radial sidewalls with each other,
the first torque transmission member includes third and fourth radial sidewalls and a second circumferential wall connecting the third and fourth radial sidewalls with each other,
the torque transmission apparatus has a spatial part defined by the first and third radial sidewalls, the second and fourth radial sidewalls and the first and second circumferential walls to enclose a predetermined amount of oil therein, and
the spatial part includes an annular spatial part where a rotation of the first torque transmission member allows the oil to flow between the first circumferential wall and the second circumferential wall rotationally and flow along the first circumferential wall upwardly, and
the first circumferential wall is formed so as to gradually increase a diameter from one side of the first torque transmission member in the direction of the rotating axis toward the other side.

2. A torque transmission apparatus comprising:
a coupling having first and second torque transmission members and a frictional clutch for transmitting a torque between the first torque transmission member and the second torque transmission member; and
a stationary housing accommodating the coupling,
wherein the coupling includes a first opening for introducing oil enclosed in the stationary housing into the coupling,
the stationary housing includes first and second radial sidewalls and a first circumferential wall connecting the first and second radial sidewalls with each other,
the first torque transmission member includes third and fourth radial sidewalls and a second circumferential wall connecting the third and fourth radial sidewalls with each other,
the torque transmission apparatus has a spatial part defined by the first and third radial sidewalls, the second and fourth radial sidewalls and the first and second circumferential walls to enclose a predetermined amount of oil therein, and
the spatial part includes an annular spatial part where a rotation of the first torque transmission member allows the oil to flow between the first circumferential wall and the second circumferential wall rotationally and flow along the first circumferential wall upwardly, and
the second circumferential wall has a large diameter part that narrows an opposing gap between the second circumferential wall and the first circumferential wall.

3. The torque transmission apparatus of any one of claims 1 and 2, further comprising:

a first oil flow path arranged between the first circumferential wall formed in the stationary housing and the second circumferential wall formed in the first torque transmission member to make the oil flow rotationally;

a converting member arranged in the first oil flow path to convert the flowing direction of the oil rotationally flowing in the first oil flow path to the direction of a rotating axis; and a second oil flow path provided in at least either the stationary housing or the first torque transmission member to make the oil flowing in the direction of the rotating axis flow radially inward.

4. The torque transmission apparatus of any one of claims 1 and 2, wherein
the annular spatial part is adapted so as to allow the oil to rotationally flow up to the upside while remaining a fluid power thereof.

5. The torque transmission apparatus of any one of claims 1 and 2, wherein
the first circumferential wall is provided with a protrusion which projects radially inward thereby to narrow an opposing gap between the first circumferential wall and the second circumferential wall.

6. The torque transmission apparatus of any one of claims 1 and 2, wherein
the frictional clutch has a plurality of fastening members arranged on the inner circumferential side of the second circumferential wall, while the first opening is formed so as to expose the plurality of fastening members along the direction of the rotating axis of the second circumferential wall.

7. A torque transmission apparatus comprising:
a coupling having first and second torque transmission members and a frictional clutch for transmitting a torque between the first torque transmission member and the second torque transmission member; and
a stationary housing accommodating the coupling,
wherein the coupling includes a first opening for introducing oil enclosed in the stationary housing into the coupling,
the stationary housing includes first and second radial sidewalls and a first circumferential wall connecting the first and second radial sidewalls with each other,
the first torque transmission member includes third and fourth radial sidewalls and a second circumferential wall connecting the third and fourth radial sidewalls with each other,
the torque transmission apparatus has a spatial part defined by the first and third radial sidewalls, the second and fourth radial sidewalls and the first and second circumferential walls to enclose a predetermined amount of oil therein, and
the spatial part includes an annular spatial part where a rotation of the first torque transmission member allows the oil to flow between the first circumferential wall and the second circumferential wall rotationally and flow along the first circumferential wall upwardly,
the coupling is arranged between the second sidewall and the fourth sidewall and also fixed to the second sidewall so as to be unable to rotate in relation to the second sidewall, the coupling having an actuator for fastening the frictional clutch,
the first circumferential wall includes a protrusion that is extended along a rotating axis of the first torque transmission member thereby to convert a rotational flow of the oil and successively make the oil flow to an interval between the actuator and the second radial sidewall, a second opening for introducing the oil flowing between the actuator and the second radial sidewall into the coupling is provided between an inner circumference of the fourth radial sidewall and the second torque transmission member, and
the protrusion is arranged on the upside of the first circumferential wall.

8. A torque transmission apparatus comprising:
a coupling having first and second torque transmission members and a frictional clutch for transmitting a torque between the first torque transmission member and the second torque transmission member; and
a stationary housing accommodating the coupling,
wherein the coupling includes a first opening for introducing oil enclosed in the stationary housing into the coupling,
the stationary housing includes first and second radial sidewalls and a first circumferential wall connecting the first and second radial sidewalls with each other,
the first torque transmission member includes third and fourth radial sidewalls and a second circumferential wall connecting the third and fourth radial sidewalls with each other,
the torque transmission apparatus has a spatial part defined by the first and third radial sidewalls, the second and fourth radial sidewalls and the first and second circumferential walls to enclose a predetermined amount of oil therein, and
the spatial part includes an annular spatial part where a rotation of the first torque transmission member allows the oil to flow between the first circumferential wall and the second circumferential wall rotationally and flow along the first circumferential wall upwardly,
the coupling is arranged between the second sidewall and the fourth sidewall and also fixed to the second sidewall so as to be unable to rotate in relation to the second sidewall, the coupling having an actuator for fastening the frictional clutch,
the first circumferential wall includes a protrusion that is extended along a rotating axis of the first torque transmission member thereby to convert a rotational flow of the oil and successively make the oil flow to an interval between the actuator and the second radial sidewall,
a second opening for introducing the oil flowing between the actuator and the second radial sidewall into the coupling is provided between an inner circumference of the fourth radial sidewall and the second torque transmission member, and
the first opening is formed in the second circumferential wall so as to be able to oppose the protrusion when the first torque transmission member rotates.

9. A torque transmission apparatus comprising:
a coupling having first and second torque transmission members and a frictional clutch for transmitting a torque between the first torque transmission member and the second torque transmission member; and
a stationary housing accommodating the coupling,
wherein the coupling includes a first opening for introducing oil enclosed in the stationary housing into the coupling,
the stationary housing includes first and second radial sidewalls and a first circumferential wall connecting the first and second radial sidewalls with each other,
the first torque transmission member includes third and fourth radial sidewalls and a second circumferential wall connecting the third and fourth radial sidewalls with each other, the torque transmission apparatus has a spatial part defined by the first and third radial sidewalls, the second and fourth radial sidewalls and the first and second circumferential walls to enclose a predetermined amount of oil therein, and the spatial part includes an annular spatial part where a rotation of the first torque transmission member allows the oil to flow between the first circumferential wall and the second circumferential wall rotationally and flow along the first circumferential wall upwardly, the coupling is arranged between the second sidewall and the fourth sidewall and also fixed to the second sidewall so as to be unable to rotate in relation to the second sidewall, the coupling having an actuator for fastening the frictional clutch, the first circumferential wall includes a protrusion that is extended along a rotating axis of the first torque transmission member thereby to convert a rotational flow of the oil and successively make the oil flow to an interval between the actuator and the second radial sidewall, and a second opening for introducing the oil flowing between the actuator and the second radial sidewall into the coupling is provided between an inner circumference of the fourth radial sidewall and the second torque transmission member, and the protrusion is extended so as to be able to oppose the plurality of fastening members.

10. A torque transmission apparatus comprising:

a coupling having first and second torque transmission members and a frictional clutch for transmitting a torque between the first torque transmission member and the second torque transmission member; and a stationary housing accommodating the coupling, wherein the coupling includes a first opening for introducing oil enclosed in the stationary housing into the coupling, the stationary housing includes first and second radial sidewalls and a first circumferential wall connecting the first and second radial sidewalls with each other, the first torque transmission member includes third and fourth radial sidewalls and a second circumferential wall connecting the third and fourth radial sidewalls with each other, the torque transmission apparatus has a spatial part defined by the first and third radial sidewalls, the second and fourth radial sidewalls and the first and second circumferential walls to enclose a predetermined amount of oil therein, and the spatial part includes an annular spatial part where a rotation of the first torque transmission member allows the oil to flow between the first circumferential wall and the second circumferential wall rotationally and flow along the first circumferential wall upwardly, the coupling is arranged between the second sidewall and the fourth sidewall and also fixed to the second sidewall so as to be unable to rotate in relation to the second sidewall, the coupling having an actuator for fastening the frictional clutch, the first circumferential wall includes a protrusion that is extended along a rotating axis of the first torque transmission member thereby to convert a rotational flow of the oil and successively make the oil flow to an interval between the actuator and the second radial sidewall, and a second opening for introducing the oil flowing between the actuator and the second radial sidewall into the coupling is provided between an inner circumference of the fourth radial sidewall and the second torque transmission member, and the protrusion has an end face whose width in the rotating direction is narrower than a width of the first opening in the rotating direction.

11. A torque transmission apparatus comprising:

a coupling having first and second torque transmission members and a frictional clutch for transmitting a torque between the first torque transmission member and the second torque transmission member; and a stationary housing accommodating the coupling, wherein the coupling includes a first opening for introducing oil enclosed in the stationary housing into the coupling, the stationary housing includes first and second radial sidewalls and a first circumferential wall connecting the first and second radial sidewalls with each other, the first torque transmission member includes third and fourth radial sidewalls and a second circumferential wall connecting the third and fourth radial sidewalls with each other, the torque transmission apparatus has a spatial part defined by the first and third radial sidewalls, the second and fourth radial sidewalls and the first and second circumferential walls to enclose a predetermined amount of oil therein, and the spatial part includes an annular spatial part where a rotation of the first torque transmission member allows the oil to flow between the first circumferential wall and the second circumferential wall rotationally and flow along the first circumferential wall upwardly, the coupling is arranged between the second sidewall and the fourth sidewall and also fixed to the second sidewall so as to be unable to rotate in relation to the second sidewall, the coupling having an actuator for fastening the frictional clutch, the first circumferential wall includes a protrusion that is extended along a rotating axis of the first torque transmission member thereby to convert a rotational flow of the oil and successively make the oil flow to an interval between the actuator and the second radial sidewall, a second opening for introducing the oil flowing between the actuator and the second radial sidewall into the coupling is provided between an inner circumference of the fourth radial sidewall and the second torque transmission member, and the protrusion has a side face inclined from the direction of the rotating axis of the first torque transmission member toward the rotating direction so as to convert the flowing direction of the oil from the rotating direction to the direction of the rotating axis.

12. A torque transmission apparatus comprising:

a coupling having first and second torque transmission members and a frictional clutch for transmitting a torque between the first torque transmission member and the second torque transmission member; and a stationary housing accommodating the coupling, wherein the coupling includes a first opening for introducing oil enclosed in the stationary housing into the coupling, the stationary housing includes first and second radial sidewalls and a first circumferential wall connecting the first and second radial sidewalls with each other, the first torque transmission member includes third and fourth radial sidewalls and a second circumferential wall connecting the third and fourth radial sidewalls with each other, the torque transmission apparatus has a spatial part defined by the first and third radial sidewalls, the second and fourth radial sidewalls and the first and second circumferential walls to enclose a predetermined amount of oil therein, and the spatial part includes an annular spatial part where a rotation of the first torque transmission member allows the oil to flow between the first circumferential wall and the second circumferential wall rotationally and flow along the first circumferential wall upwardly, the coupling is arranged between the second sidewall and the fourth sidewall and also fixed to the second sidewall so as to be unable to rotate in relation to the second sidewall, the coupling having an actuator for fastening the frictional clutch, the first circumferential wall includes a protrusion that is extended along a rotating axis of the first torque transmission member thereby to convert a rotational flow of the oil and successively make the oil flow to an interval between the actuator and the second radial sidewall, a second opening for introducing the oil flowing between the actuator and the second radial sidewall into the coupling is provided between an inner circumference of the fourth radial sidewall and the second torque transmission member, and the protrusion is formed by a separated body from the first circumferential wall and fixed to the inner circumferential side of the first circumferential wall.

13. A torque transmission apparatus comprising:
a coupling having first and second torque transmission members and a frictional clutch for transmitting a torque between the first torque transmission member and the second torque transmission member; and
a stationary housing accommodating the coupling,
wherein the coupling includes a first opening for introducing oil enclosed in the stationary housing into the coupling,
the stationary housing includes first and second radial sidewalls and a first circumferential wall connecting the first and second radial sidewalls with each other,
the first torque transmission member includes third and fourth radial sidewalls and a second circumferential wall connecting the third and fourth radial sidewalls with each other,
the torque transmission apparatus has a spatial part defined by the first and third radial sidewalls, the second and fourth radial sidewalls and the first and second circumferential walls to enclose a predetermined amount of oil therein, and
the spatial part includes an annular spatial part where a rotation of the first torque transmission member allows the oil to flow between the first circumferential wall and the second circumferential wall rotationally and flow along the first circumferential wall upwardly,
the coupling is arranged between the second sidewall and the fourth sidewall and also fixed to the second sidewall so as to be unable to rotate in relation to the second sidewall, the coupling having an actuator for fastening the frictional clutch,
the first circumferential wall includes a protrusion that is extended along a rotating axis of the first torque transmission member thereby to convert a rotational flow of the oil and successively make the oil flow to an interval between the actuator and the second radial sidewall,
a second opening for introducing the oil flowing between the actuator and the second radial sidewall into the coupling is provided between an inner circumference of the fourth radial sidewall and the second torque transmission member, and
the protrusion has a collecting wall part for collecting the oil.

14. The torque transmission apparatus of any one of claims 7, 8, 9, 10, 11, 12, and 13, wherein
the protrusion has a side face formed to convert a flowing of the oil from the rotating direction to the radial direction.

15. The torque transmission apparatus of any one of claims 7, 8, 9, 10, 11, 12, and 13, wherein
the actuator is shaped to be annular,
the spatial part is compartmentalized in the direction of the rotating axis through seals, and the spatial part has a second spatial part formed on the protrusion to communicate with the annular spatial part.

16. The torque transmission apparatus of claim 15, wherein at least either the first radial sidewall or the actuator has a second opening formed to communicate the annular spatial part with the second spatial part.

17. A torque transmission apparatus comprising:
a coupling having first and second torque transmission members and a frictional clutch for transmitting a torque between the first torque transmission member and the second torque transmission member; and
a stationary housing accommodating the coupling, wherein the coupling includes a first opening for introducing oil enclosed in the stationary housing into the coupling, and
an inner circumferential side of a second circumferential wall,
a first frictional clutch and a second frictional clutch as the frictional clutch; and
a cam mechanism that converts a fastening force of the second frictional clutch to an axial thrust force and also fastens the second frictional clutch due to the axial thrust force, wherein
the first opening is formed in the second circumferential wall so as to expose at least two of the first frictional clutch, the second frictional clutch and the cam mechanism.

18. The torque transmission apparatus of claim 17, wherein the stationary housing includes first and second housing parts.

* * * * *